US011706695B2

(12) United States Patent
Shih et al.

(10) Patent No.: US 11,706,695 B2
(45) Date of Patent: *Jul. 18, 2023

(54) METHOD AND APPARATUS FOR RECEIVING SYSTEM INFORMATION

(71) Applicant: FG Innovation Company Limited, Tuen Mun (HK)

(72) Inventors: Mei-Ju Shih, Taipei (TW); Chie-Ming Chou, Taipei (TW); Hung-Chen Chen, Taipei (TW); Yung-Lan Tseng, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

This patent is subject to a terminal disclaimer.

(21) Appl. No.: 17/573,125

(22) Filed: Jan. 11, 2022

(65) Prior Publication Data
US 2022/0132395 A1   Apr. 28, 2022

Related U.S. Application Data

(63) Continuation of application No. 17/084,597, filed on Oct. 29, 2020, now Pat. No. 11,259,236, which is a
(Continued)

(51) Int. Cl.
*H04W 48/08* (2009.01)
*H04W 76/11* (2018.01)
(Continued)

(52) U.S. Cl.
CPC ............. *H04W 48/08* (2013.01); *H04W 8/08* (2013.01); *H04W 72/23* (2023.01);
(Continued)

(58) Field of Classification Search
CPC ..... H04W 48/08; H04W 80/02; H04W 76/25; H04W 8/08; H04W 72/14; H04W 76/27;
(Continued)

(56) References Cited

U.S. PATENT DOCUMENTS 10,306,470 B2 * 5/2019 Agiwal ............... H04W 12/122
10,887,832 B2 * 1/2021 Ohlsson ................ H04W 48/18
(Continued)

OTHER PUBLICATIONS

Valcarenghi, Luca, et al. "Requirements for 5G fronthaul." 2016 18th International Conference on Transparent Optical Networks (ICTON). IEEE, 2016. (Year: 2016).*
(Continued)

*Primary Examiner* — Sharad Rampuria
(74) *Attorney, Agent, or Firm* — ScienBiziP, P.C.

(57) ABSTRACT

A method for providing system information (SI) performed by a base station (BS) is provided. The method includes: broadcasting a system information block type 1 (SIB1) associated with a cell; receiving, from a user equipment (UE), a first message including a common control channel (CCCH) service data unit (SDU), the CCCH SDU including a radio resource control (RRC) SI request message; and transmitting, to the UE, a medium access control (MAC) control element (CE) including a UE contention resolution identity that matches a portion of the CCCH SDU. The MAC CE enables a MAC entity of the UE to indicate reception of an acknowledgment for the RRC SI request message to an RRC entity of the UE. The SIB1 does not include information related to a Random Access (RA) resource specific to SI requested by the RRC SI request message.

20 Claims, 12 Drawing Sheets

Related U.S. Application Data continuation of application No. 16/408,507, filed on May 10, 2019, now Pat. No. 10,880,815.

(60) Provisional application No. 62/670,227, filed on May 11, 2018.

(51) Int. Cl.

| | | |
|---|---|---|
| *H04W 74/08* | (2009.01) | |
| *H04W 76/27* | (2018.01) | |
| *H04W 8/08* | (2009.01) | |
| *H04W 76/25* | (2018.01) | |
| *H04W 80/02* | (2009.01) | |
| *H04W 72/23* | (2023.01) | |
| *H04W 84/04* | (2009.01) | |

(52) U.S. Cl.
CPC ........ *H04W 74/0833* (2013.01); *H04W 76/11* (2018.02); *H04W 76/25* (2018.02); *H04W 76/27* (2018.02); *H04W 80/02* (2013.01); *H04W 84/042* (2013.01)

(58) Field of Classification Search
CPC ............. H04W 74/0833; H04W 76/11; H04W 84/042; H04W 48/12; H04W 72/04; H04W 72/12; H04W 76/00; H04B 7/2121; H04B 7/2123; H04J 2203/0069; H04Q 2213/394
See application file for complete search history.

(56) References Cited

U.S. PATENT DOCUMENTS

2017/0295489 A1 10/2017 Agiwal et al.
2019/0124715 A1* 4/2019 Chen .................... H04W 48/14

OTHER PUBLICATIONS

"3rd Generation Partnership Project; Technical Specification Group Radio Access Network; Evolved Universal Terrestrial Radio Access (E-UTRA); Radio Resource Control (RRC); Protocaol specification (Release 15)", 3GPP TS 36.331 V15.1.0, XP051545937, May 9, 2018.
ZTE: "On-demand SI: further consideration on the Msg3 Content", 3GPP Draft, R2-1710419, XP051342464, Oct. 8, 2017.
Samsung: "Other system information delivery", 3GPP Draft, R1-1715911, XP051339370, Sep. 17, 2017.
New Postcom: "Analysis of RAN options for Fast path and Connectionless solutions", 3GPP Draft; R2-132098, XP050700184, May 14, 2013.

* cited by examiner

```
RRCSystemInfoRequest-IE ::= SEQUENCE {
   plmn-Identity                   PLMN-Identity,
   ......
}
```

400

```
PLMN-Identity ::=           SEQUENCE {
    mcc                 MCC         OPTIONAL,         -- Cond MCC
    mnc                 MNC
}
MCC ::=                 SEQUENCE (SIZE (X)) OF MCC-MNC-Digit
MNC ::=                 SEQUENCE (SIZE (Y)) OF MCC-MNC-Digit
MCC-MNC-Digit ::=       INTEGER (0..9)
```

500

```
RRCSystemInfoRequest-IE ::= SEQUENCE {
    plmn-Identity           Truncated-PLMN-Identity,
    ......
}
```

```
Truncated-PLMN-Identity ::=        SEQUENCE {
   mcc     Truncated-MCC           OPTIONAL,
   mnc     Truncated-MNC
}
Truncated-MCC ::=     SEQUENCE (SIZE (X1)) OF MCC-MNC-Digit
Truncated-MNC ::=     SEQUENCE (SIZE (Y1)) OF MCC-MNC-Digit
MCC-MNC-Digit ::=     INTEGER (0..9)
```

```
SIBx ::= SEQUENCE {
   Cell-specific-IE      Cell-Specific-Info,    OPTIONAL,
   PLMN#1-specific-IE    PLMN#1-Specific-Info,  --Cond O,
   PLMN#2-specific-IE    PLMN#2-Specific-Info,  --Cond O,
   ...
}
```

```
SIBx ::= SEQUENCE {
   Cell-specific-IE    Cell-Specific-Info,      OPTIONAL,
   PLMN-specific-IE    PLMN-Specific-Info-List, --Cond O,
}
PLMN-Specific-Info-List ::=  SEQUENCE (SIZE (1..
maxPLMNIdentities)) OF PLMN-Specific-Info PLMN-Specific-Info ::=   SEQUENCE {
   plmn-Identity    PLMN-Identity
   plmn-info        PLMN-INFO
}
```

FIG. 8

```
SIB#A-version#1 ::= SEQUENCE {
   PLMN#1-specific-IE    PLMN#1-Specific-Info,     --Cond O,
   ......
}
SIB#A-version#2 ::= SEQUENCE {
   PLMN#2-specific-IE    PLMN#2-Specific-Info,     --Cond O,
   ......
}
```

FIG. 9

```
SIB1 ::=        SEQUENCE {
   si-SchedulingInfo      SI-SchedulingInfo        OPTIONAL,
   ...
}

SI-SchedulingInfo ::=          SEQUENCE {
   schedulingInfoList   SEQUENCE (SIZE (1..maxSI-Message)) OF
SchedulingInfo,
   ...
}

SchedulingInfo ::= SEQUENCE {
   si-BroadcastStatus   ENUMERATED {broadcast, non-broadcast},
   si-Periodicity       ENUMERATED {rf8, rf16, rf32, rf64,
rf128, rf256, rf512},
   sib-MappingInfo      SIB-Mapping
   si-plmn              SI-PLMN-INFO,
}
```

FIG. 10

```
SIB1 ::=        SEQUENCE {
   PLMN-SI-SchedulingInfoList ::=    SEQUENCE (SIZE
(1..maxPLMNIdentities)) OF si-SchedulingInfoList
   Cell-specific-si-scheuldingInfo   SI-SchedulingInfo
   OPTIONAL,
} si-SchedulingInfoList   ::= SEQUENCE {
   Plmn-Identity         PLMN-Identity,
   si-SchedulingInfo     SI-SchedulingInfo         OPTIONAL,
}
```

FIG. 11

METHOD AND APPARATUS FOR RECEIVING SYSTEM INFORMATION

CROSS-REFERENCE TO RELATED APPLICATION(S)

This application is a continuation application of U.S. patent application Ser. No. 17/084,597, filed on Oct. 29, 2020, which is a continuation application of U.S. patent application Ser. No. 16/408,507, filed on May 10, 2019, which claims the benefit of and priority to a U.S. Provisional Patent Application Ser. No. 62/670,227, filed on May 11, 2018, the contents of all of which are hereby fully incorporated herein by reference.

FIELD

The present disclosure is generally related to wireless communication, and, more specifically, to the transmission and reception of system information (SI) for the next generation wireless communication networks.

BACKGROUND

The concept of an on-demand System Information (SI) request has been introduced in the next generation wireless network (e.g., a $5^{th}$ generation (5G) new radio (NR) network). When a user equipment (UE) finds that a required SI message is not broadcast, the UE may perform an on-demand SI request procedure to request the network to broadcast the required System Information Blocks (SIBS) and/or the SI message(s). Another important feature in the next generation wireless network is network sharing, which allows multiple public land mobile networks (PLMNs) to operate the same cell. Therefore, there is a need for providing a method for transmitting and receiving PLMN-specific system information in a shared network.

SUMMARY

The present disclosure is directed to the transmission and reception of the system information for the next generation wireless communication networks.

In a first aspect of the present disclosure, a method for providing SI performed by a base station (BS) is provided. The method includes broadcasting a system information block type 1 (SIB1) associated with a cell; receiving, from a UE, a first message including a common control channel (CCCH) service data unit (SDU), the CCCH SDU including a radio resource control (RRC) SI request message; and transmitting, to the UE, a medium access control (MAC) control element (CE) including a UE contention resolution identity that matches a portion of the CCCH SDU. The MAC CE enables a MAC entity of the UE to indicate reception of an acknowledgment for the RRC SI request message to an RRC entity of the UE. The SIB1 does not include information related to a Random Access (RA) resource specific to SI requested by the RRC SI request message.

In an implementation of the first aspect, the SIB1 includes a first list, a number of entries in the first list ranging from one to a number of public land mobile networks (PLMNs) operating the cell, and each entry in the first list includes an indicator corresponding to a PLMN operating the cell and access control information of the PLMN operating the cell.

In another implementation of the first aspect, the SIB1 further includes a second list, a number of entries in the second list ranging from one to the number of PLMNS operating the cell, and each entry in the second list includes a PLMN identity, a cell identity, and a tracking area code.

In another implementation of the first aspect, the SIB1 further includes cell-specific scheduling information.

In another implementation of the first aspect, the SIB1 further includes scheduling information indicating whether an SI message is broadcast.

In another implementation of the first aspect, the scheduling information further indicates PLMN information corresponding to the SI message.

In another implementation of the first aspect, the RRC SI request message is received by the MAC entity of the UE via a CCCH, which is configured with a transparent mode radio link control (RLC) entity In another implementation of the first aspect, the MAC CE enables the UE to start a timer after receiving the MAC CE, and the RRC SI request message includes information related to the timer.

In another implementation of the first aspect, the MAC CE further includes at least one of a broadcast delay time, a broadcast monitoring duration, an uplink (UL) grant, or a downlink (DL) grant.

Another implementation of the first aspect further comprises receiving, from the UE, a second message to complete an RRC connection setup procedure. The second message includes at least one of a UE Identifier (ID), an inactive radio network temporary identifier (I-RNTI), PLMN information, a registered Mobility Management Entity (MME) or Access and Mobility Management Function (AMF), dedicated non-access stratum (NAS) information, or a System Architecture Evolution (SAE)-Temporary Mobile Subscriber Identity (S-TMSI).

In a second aspect of the present disclosure, a BS for performing a method for providing SI is provided. The BS includes one or more non-transitory computer-readable media having computer-executable instructions embodied thereon and at least one processor coupled to the one or more non-transitory computer-readable media. The at least one processor is configured to execute the computer-executable instructions to cause the BS to broadcast an SIB1 associated with a cell; receive, from a UE, a first message including a CCCH SDU, the CCCH SDU including an RRC SI request message; and transmit, to the UE, a MAC CE including a UE contention resolution identity that matches a portion of the CCCH SDU. The MAC CE enables a MAC entity of the UE to indicate reception of an acknowledgment for the RRC SI request message to an RRC entity of the UE. The SIB1 does not include information related to an RA resource specific to SI requested by the RRC SI request message.

BRIEF DESCRIPTION OF THE DRAWINGS

Aspects of the present disclosure are best understood from the following detailed description when read with the accompanying figures. Various features are not drawn to scale. Dimensions of various features may be arbitrarily increased or reduced for clarity of discussion.

FIG. 8 illustrates another format of an SIB, according to an example implementation of the present disclosure.

FIG. 9 illustrates an example of different versions of the same SIB, according to an example implementation of the present disclosure.

FIG. 10 illustrates another format of an SIB, according to an example implementation of the present disclosure.

FIG. 11 illustrates another format of an SIB, according to an example implementation of the present disclosure.

DESCRIPTION

Figure 1:
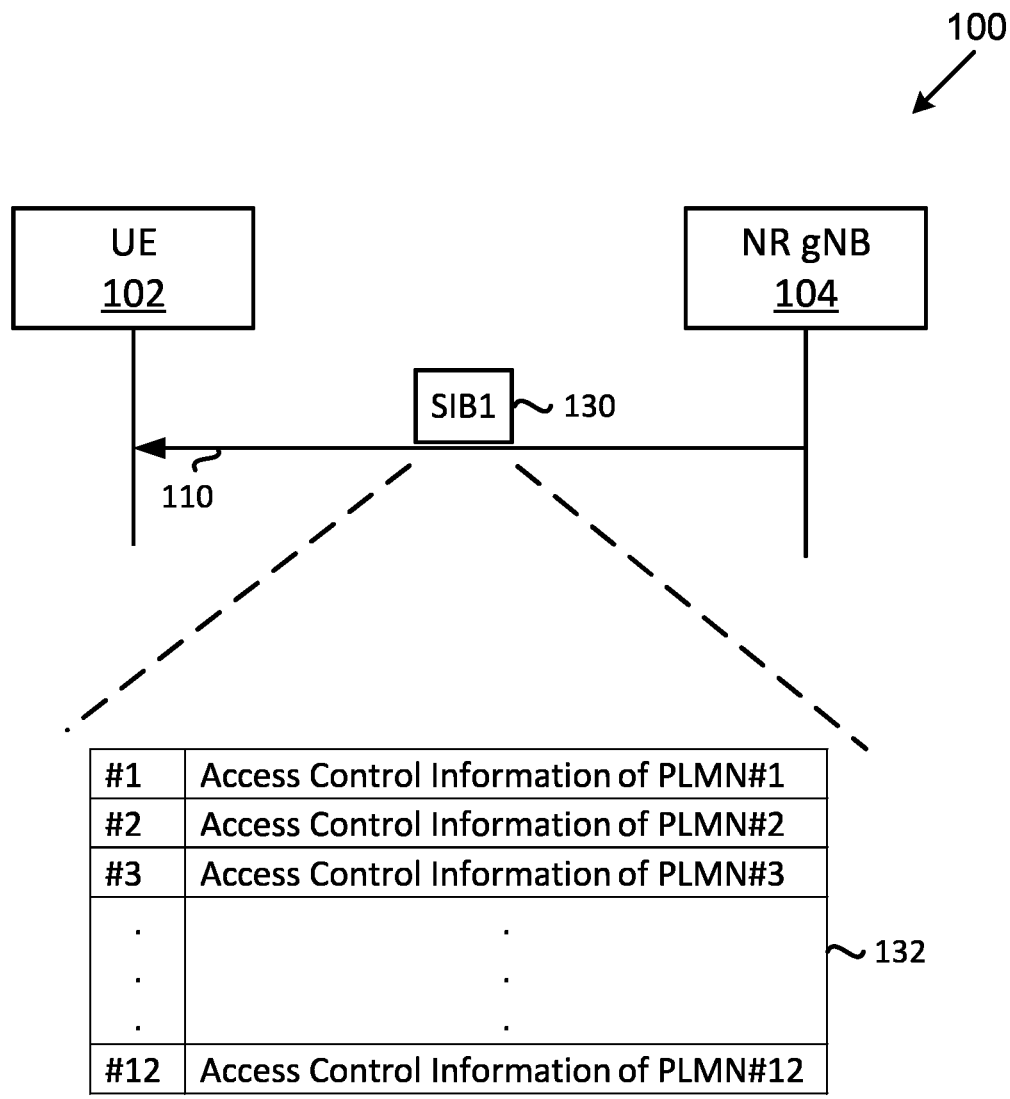
FIG. 1 is a diagram illustrating the system information transmission between a UE and a next-generation Node B (gNB), according to an example implementation of the present disclosure.

The following contains specific information related to example implementations of the present disclosure. The drawings and their accompanying detailed description are merely directed to example implementations. However, the present disclosure is not limited to these example implementations. Other variations and implementations of the present disclosure will be obvious to those skilled in the art.

Unless noted otherwise, like or corresponding elements among the drawings may be indicated by like or corresponding reference designators. Moreover, the drawings in the present disclosure are generally not to scale, and are not intended to correspond to actual relative dimensions.

For the purpose of consistency and ease of understanding, like features may be identified (although, in some examples, not illustrated) by the same reference designators in the drawings. However, the features in different implementations may differ in other respects and shall not be narrowly confined to the implementations illustrated in the drawings.

The phrases "in one implementation," or "in some implementations," may each refer to one or more of the same or different implementations. The term "coupled" is defined as connected whether directly or indirectly via intervening components and is not necessarily limited to physical connections. The term "comprising" means "including, but not necessarily limited to" and specifically indicates open-ended inclusion or membership in the disclosed combination, group, series or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for disclosing associated objects and represents that three relationships may exist such that A and/or B may indicate that A exists alone, A and B exist at the same time, or B exists alone. "A and/or B and/or C" may represent that at least one of A, B, and C exists. The character "/" generally represents that the associated objects are in an "or" relationship.

For the purposes of explanation and non-limitation, specific details, such as functional entities, techniques, protocols, standards, and the like, are set forth for providing an understanding of the disclosed technology. In other examples, detailed disclosure of well-known methods, technologies, systems, architectures, and the like are omitted so as not to obscure the present disclosure with unnecessary details.

Persons skilled in the art will immediately recognize that any disclosed network function(s) or algorithm(s) may be implemented by hardware, software or a combination of software and hardware. Disclosed functions may correspond to modules which may be software, hardware, firmware, or any combination thereof.

A software implementation may include computer-executable instructions stored on a computer-readable medium such as memory or other type of storage devices. One or more microprocessors or general-purpose computers with communication processing capability may be programmed with corresponding executable instructions and perform the disclosed network function(s) or algorithm(s).

The microprocessors or general-purpose computers may include Applications Specific Integrated Circuitry (ASIC), programmable logic arrays, and/or using one or more Digital Signal Processors (DSPs). Although some of the disclosed implementations are oriented to software installed and executing on computer hardware, alternative example implementations implemented as firmware or as hardware or as a combination of hardware and software are well within the scope of the present disclosure.

The computer-readable medium may include, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long-Term Evolution (LTE) system, an LTE-Advanced (LTE-A) system, an LTE-Advanced Pro system, or a 5G NR, Radio Access Network (RAN) may typically include at least one Base Station (BS), at least one UE, and one or more optional network elements that provide connection within a network. The UE may communicate with the network such as a Core Network (CN), an Evolved Packet Core (EPC) network, an Evolved Universal Terrestrial Radio Access Network (E-UTRAN), a Next-Generation Core (NGC), a 5G Core (5GC), or an internet via a RAN established by one or more BSs.

A UE may include, but is not limited to, a mobile station, a mobile terminal or device, or a user communication radio terminal. The UE may be a portable radio equipment that includes, but is not limited to, a mobile phone, a tablet, a wearable device, a sensor, a vehicle, or a Personal Digital Assistant (PDA) with wireless communication capability. The UE may be configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM that is often referred to as 2G), GSM Enhanced Data rates for GSM Evolution (EDGE) Radio Access Network (GERAN), General Packet Radio Service (CPRS), Universal Mobile Telecommunication System (UMTS that is often referred to as 3G) based on basic Wideband-Code Division Multiple Access (W-CDMA), High-Speed Packet Access (HSPA), LTE, LTE-A, evolved/enhanced LTE (eLTE) that is LTE connected to 5GC, NR (often referred to as 5G), and/or LTE-A Pro. However, the scope of the present disclosure is not limited to these protocols.

The BS may include, but is not limited to, a node B (NB) in the UMTS, an evolved node B (eNB) in LTE or LTE-A, a Radio Network Controller (RNC) in UMTS, a Base Station Controller (BSC) in the GSM GERAN, a next-generation eNB (ng-eNB) in an Evolved Universal Terrestrial Radio Access (E-UTRA) BS in connection with 5GC, a next-generation Node B (gNB) in the 5G RAN (or in the 5G Access Network (5G-AN)), or any other apparatus capable of controlling radio communication and managing radio resources within a cell. The BS may serve one or more UEs via a radio interface.

The BS may be operable to provide radio coverage to a specific geographical area using a plurality of cells included in the RAN. The BS may support the operations of the cells. Each cell may be operable to provide services to at least one UE within its radio coverage.

Each cell (often referred to as a serving cell) may provide services to serve one or more UEs within its radio coverage such that each cell schedules the DL and optionally UL resources to at least one UE within its radio coverage for DL and optionally UL packet transmissions. The BS may communicate with one or more UEs in the radio communication system via the plurality of cells.

A cell may allocate Sidelink (SL) resources for supporting Proximity Service (ProSe), LTE SL services, and/or LTE/NR Vehicle-to-Everything (V2X) service. Each cell may have overlapped coverage areas with other cells. In Multi-RAT Dual Connectivity (MR-DC) cases, the primary cell of a Master Cell Group (MCG) or a Secondary Cell Group (SCG) may be called a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), comprising of the SpCell and optionally one or more Secondary Cells (SCells). An SCG may refer to a group of serving cells associated with the Secondary Node (SN), comprising of the SpCell and optionally one or more SCells As disclosed previously, the frame structure for NR supports flexible configurations for accommodating various next-generation (e.g., 5G) communication requirements such as enhanced mobile broadband (eMBB), massive machine type communication (mMTC), and ultra reliable and low latency communication (URLLC), while fulfilling high reliability, high data rate and low latency requirements. The Orthogonal Frequency-Division Multiplexing (OFDM) technology in the $3^{rd}$ Generation Partnership Project (3GPP) may serve as a baseline for an NR waveform. The scalable OFDM numerology such as adaptive sub-carrier spacing, channel bandwidth, and Cyclic Prefix (CP) may also be used.

Two coding schemes are considered for NR: specifically Low-Density Parity-Check (LDPC) code and Polar Code. The coding scheme adaption may be configured based on channel conditions and/or service applications.

At least DL transmission data, a guard period, and an UL transmission data should be included in a transmission time interval (TTI) of a single NR frame. The respective portions of the DL transmission data, the guard period, and the LT transmission data should also be configurable based on, for example, the network dynamics of NR. SL resources may also be provided in an NR frame to support ProSe services or V2X services.

As disclosed previously, when a UE determines that a required SI message is not broadcast by a base station (e.g., a gNB), the UE may perform an on-demand SI request procedure to request the network to broadcast the required SI message(s). In some implementations, the on-demand SI request procedure may include a Message 1 (MSG-1) based approach and a Message 3 (MSG3) based approach.

In some implementations of the present disclosure, if the minimum SI includes information related to a Random Access (RA) preamble and/or a Physical Random Access Channel (PRACH) occasion specific to each SIB or set of SIBs (which the UE needs to acquire), the SI request may be indicated using an MSG1-based approach. The RA preamble that the UE transmits (e.g., during MSG1 transmission in the 4-step RA procedure, or during MSGA transmission in the 2-step RA procedure) may correspond to the SI (e.g., SIB, SI message) requested by the UE. The PRACH occasion(s) where the UE transmits the RA preamble (e.g., during MSG1 transmission in the 4-step RA procedure, or during MSGA transmission in the 2-step RA procedure) may be associated with the system information (e.g., SIB, SI message) requested by the UE. The UE may implicitly inform the base station of the requested SI (e.g., SIB, SI message) via the RA preamble and/or the PRACH occasion(s). The minimum SI may include the Master Information Block (MIB) and the SIB1. In some implementations, a Message 2 (MSG2) (e.g., random access response (RAR)) may include a Random Access Preamble Index (RAPID). The MSG2 may not include fields such as Timing Advance (TA), UL grant and Temporary Cell Radio Network Temporary Identifier (C-RNTI). The UE may consider an RA procedure for an SI request as successful when the UE receives an MSG2 (e.g., RAR) that includes an RAPID corresponding to the transmitted RA preamble (e.g., during MSG1 transmission in the 4-step RA procedure, or during MSGA transmission in the 2-step RA procedure). The medium access control (MAC) entity of the UE may indicate, to the upper layers (e.g., RRC layer) of the UE, that it receives an acknowledgement for the SI request. The UE may consider an RA procedure for the SI request as successful when the UE receives an MSG2 (e.g., RAR) that includes the information related to the PRACH occasion(s) where the UE transmits the RA preamble (e.g., during MSGI transmission in the 4-step RA procedure, or during MSGA transmission in the 2-step RA procedure). The UE may receive the MSG2 (e.g., RAR) identified by a Random Access-Radio Network Temporary Identifier (RA-RNTI) that is associated with the PRACH occasion where the RA preamble is transmitted by the UE.

The SI request may be considered unsuccessful when the UE does not receive an MSG2 RAR) within an RAR window. In some implementations of the present disclosure, the UE may retransmit the RA preamble according to an NR RA power ramping when the SI request is considered as unsuccessful. In one implementation, retransmission of the RA preamble may continue until the number of preamble transmissions reaches a predetermined threshold. Thereafter, an RA problem may be indicated to the upper layer (e.g., RRC layer).

In some implementations of the present disclosure, if the minimum SI does not include information related to the RA preamble and/or the PRACH resource (or PRACH occasions) specific to each SIB or set of SIBs (which the UE needs to acquire), an SI request may be transmitted using an MSG3-based approach. The MSG3 transmitted by the UE may indicate the requested SI. The UE may determine whether the MSG3-based approach is successful or not based on a reception of an MSG4. In the MSG3-based approach for the SI request, the preamble(s) and/or the PRACH occasions may not be reserved in some aspects of the present implementations. Radio Resource Control (RRC) signaling may be used for the SI request in an MSG3-based approach. The RRC message including the SI request may be called an RRC System Information Request message (e.g., RRCSystemInfoRequest message). The RRC message including the SI request may be carried by Signaling Radio Bearer 0 (e.g., SRB0) from an RRC layer of the UE to a MAC, layer of the UE. The SRB0 carrying the RRC message including the SI request may be carried via the common control channel (CCCH), which is configured with transparent mode (TM) Radio Link Control (RLC) entity. The MSG3 may include the CCCH service data unit (SDU), which may include an RRC message for the SI request (e.g., RRCSystemInfoRequest message).

In some implementations of the present disclosure, the UE may use a temporary C-RNTI received in the MSG2 (e.g., RAR) for an MSG4 reception. The UE may monitor the Physical Downlink Control Channel (PDCCH) transmission addressed to the temporary C-RNTI which the UE receives in the MSG2 (e.g., RAR) to receive the MSG4. The MSG4 may include a contention resolution MAC CE. The UE may check the contention resolution MAC CE against the CCCH SDU that includes the SI request transmitted in the MSG3.

An SIB1 may carry the scheduling information for the System information (SI) messages. The scheduling information of an SI message may include the periodicity of the SI message and what types of SIBs may be carried by the SI message. Mapping of the SIBs to the SI messages may be flexibly configured by the scheduling information in the SIB1. However, each SIB may be contained only in a single SI message, and at most once in the SI message. Only the SIBs that have the same scheduling requirement (e.g., periodicity) may be mapped to the same SI message. Therefore, the SIBs in the same SI message may be broadcast with the same periodicity. There may be multiple SI messages transmitted with the same periodicity. The SIB1 and all SI messages may be transmitted on the Downlink Shared Channel (DL-SCI). The SIBs carried by the SI messages may broadcast cell-specific system information.

In the next-generation cellular network, network sharing may become more popular. For example, in LTE, at most six PLMNs may share the same LTE eNB. The LTE SIB1 may broadcast at most six PLMN identities in the cell access related information. The UEs that select a specific PLMN whose identity is broadcast by the LTE eNB may select and access the LTE cell. Other UEs that select different PLMNs, but camp on the same cell, may share the same cell-specific system information. In NR, in one implementation, up to twelve PLMN IDs may be broadcast in the minimum SI by an NR gNB. Each PLMN may set its own Tracking Area Code (TAC) and cell identity for a shared NR cell.

Additionally, several parameters in the SI may be PLMN-specific. For example, in NR, it is possible (but not limited) to set an SI area identity (ID), a TAC, a cell identity (Cell ID), cell reservation indication and access control parameters per PLMNs. Each PLMN identity (or indicator) may correspond to an SI area identity, a tracking area code, a cell identity, cell reservation indication and/or access control parameters. However, the transport block (TB) size may be limited. The TB size may increase to carry the PLMN-specific parameters in the system information. Therefore, it is important to design the method of carrying the PLMN-specific parameters in the SI, as well as the method of requesting and providing the SI. In NR, the gNB may transmit the SI using three different approaches: periodic broadcast, on-demand broadcast, and on-demand unicast. Some implementations of the present disclosure are related to a method of the PLMN-specific system information delivery, e.g., via periodic broadcasting, on-demand broadcasting, and/or on-demand unicasting. Additionally, the PLMN-specific system information signaling structure is provided by some of the present implementations.

FIG. 1 is a diagram 100 illustrating the system information transmission between a UE and a gNB, according to an example implementation of the present disclosure. As illustrated in diagram 100, in action 110, a UE 102 may receive an SIB1 130 (e.g., as portion of the minimum SI) from a cell, which may belong to one of the cells controlled by an NR gNB 104. The NR gNB 104 in the present disclosure is merely used as an example of a base station. The method of the present disclosure may also be applicable to other types of base stations. The SIB1 130 may include a first list 132. The number of entries in the first list 132 may range from one to the number of PLMNs operating the cell. In the example illustrated in FIG. 1, the first list 132 may include twelve entries. Each entry in the first list 132 may include an indicator corresponding to a PLMN operating the cell and access control information of the PLMN operating the cell.

The indicator in the first list 132 may be in the form of an index, a bitmap, an integer, or other appropriate formats capable of indicating a specific PLMN. For example, if there are 7 PLMNs operating a cell, a 3-bit index, a 7-bit bitmap, or an integer may be used to indicate a specific PLMN. For the 3-bit index approach, "000" may indicate the first entry in the first list 132, "001" may indicate the second entry in the first list 132, "010" may indicate the third entry in the first list 132, and so on. For the 7-bit bitmap approach, "0000001" may indicate the first entry in the first list 132, "0000010" may indicate the second entry, "0000100" may indicate the third entry, and so on. For the integer approach, "1" may indicate the first entry in the first list 132. "2" may indicate the second entry in the first list 132, "3" may indicate the third entry in the first list 132, and so on.

The indicator in the first list 132 may be a complete PLMN ID or a truncated PLMN ID. The complete PLMN ID may include a Mobile Country Code (MCC) and a Mobile Network Code (MNC). The truncated PLMN ID may include a portion of the complete PLMN ID. The MCC may include 3 decimal digits and the MNC may also include 3 decimal digits. The complete PLMN ID may include 6 digits, and the truncated PLMN ID may include an MCC fewer than 3 digits and/or an MNC fewer than 3 digits. The truncated PLMN ID may not have an MCC and only include an MNC having 3 digits or less. For example, in some aspects of the present implementations, the MCC field may be optional.

As illustrated in FIG. 1, the right column in the first list 132 may be the access control information corresponding to the PLMN illustrated in the left column in the first list 132. The access control information of a PLMN may include one or more access control parameters. One of the access control parameters may indicate a possibility value that a UE may be connected to the cell owned by the PLMN. The possibility value may represent the success probability that the access attempt made by the UE will be allowed by the cell. One of the access control parameters may indicate a time value during which the UE may be barred from access to the cell. Upon receiving the SIB1 130, the UE 102 may recognize the access control information of each PLMN operating the cell belonging to the NR gNB 104.

Figures 2, 3:
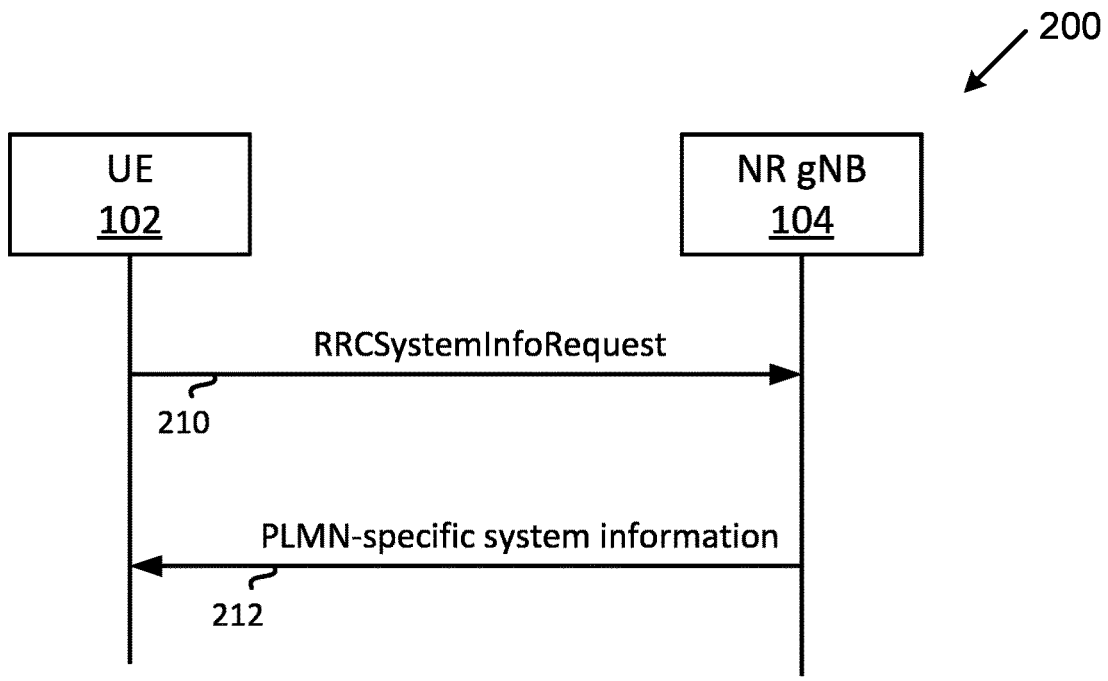
FIG. 2 is a diagram illustrating a process of system information request and response, according to an example implementation of the present disclosure.
FIG. 3 illustrates one format of an RRC system information request message, according to an example implementation of the present disclosure.

FIG. 2 is a diagram illustrating a process 200 of system information request and response, according to an example implementation of the present disclosure. The process 200 may include actions 210 and 212. In action 210, the UE 102 may transmit an RRC message to request system information (e.g., RRCSystemInfoRequest message) from the NR gNB 104. The RRCSystemInfoRequest message may include the PLMN information associated with the UE 102. In action 212, upon receiving the RRCSystemInfoRequest message including the PLMN information of the UE 102, the NR gNB 104 may transmit the PLMN-specific SI (e.g., SIB(s), SI message, etc.) requested by the UE 102. For example, if the PLMN information of the UE 102 transmitted in action 210 indicates that the UE 102 registers to PLMN#3, the SI transmitted in action 212 may be SI specific to the PLMN#3. In action 212, the NR gNB 104 may transmit the PLMN-specific SI to the UE 102 via broadcast or via dedicated DL resources (e.g., unicast). The RRCSystemInfoRequest message may be transmitted from the UE 102 to the NR gNB 104. The RRCSystemInfoRequest message may be carried via the CCCH (e.g., from the RLC entity of the UE 102 to the MAC entity of the UE 102, from the MAC entity of the NR gNB 104 to the RLC entity of the NR gNB 104), which may be configured with a transparent mode (TM) RLC entity, with the signaling radio bearer of SRB0. The RRC Packet Data. Unit (PDU) that includes the RRCSystemInfoRequest message may be mapped to an RLC Service Data Unit (SDU) for transmission. The CCCH may be a logical channel offered by the MAC entities of the UE 102 and the NR gNB 104.

There may be several approaches for the UE 102 to indicate its PLMN information to the NR gNB 104 in an RRC message (e.g., RRCSystemInfoRequest message):

Case#1-1: The UE 102 may include its complete PLMN ID in the RRC message (e.g., RRCSystemInfoRequest message). FIG. 3 illustrates one format of an RRC system information request message, according to an example implementation of the present disclosure. Abstract Syntax Notation One (ASN.1) may be used to describe the data structure of various implementations of a message in the present disclosure. As illustrated in FIG. 3, a data structure 300 of the RRCSystemInfoRequest message may include the complete PLMN ID or the truncated PLMN ID.

Figure 4:
FIG. 4 illustrates an example of a PLMN identity, according to an example implementation of the present disclosure.

FIG. 4 illustrates an example of a PLMN identity, according to an example implementation of the present disclosure. A data structure 100 of a complete PLMN ID may include optional X MCC digits and Y MNC digits. X and Y may be zero or positive integer(s). As illustrated in FIG. 1, the X MCC digits may be optionally present in the complete PLMN ID. The X MCC digits may be present in the complete PLMN ID when the corresponding PLMN is the first entry in a list of PLMNs (e.g., the first list 132 illustrated in FIG. 1). In such implementation, the X MCC digits may be absent in the complete PLMN ID when the corresponding PLMN is not the first entry in the list of PLMNs.

Figure 5:
FIG. 5 illustrates another format of an RRC system information request message, according to an example implementation of the present disclosure.

Case#1-2: the UE 102 may include its truncated PLMN ID in the RRC message (e.g., RRCSystemInfoRequest message). FIG. 5 illustrates another format of an RRC system information request message, according to an example implementation of the present disclosure. As illustrated in FIG. 5, a data structure 500 of the RRCSystemInfoRequest message may include the truncated PLMN ID.

The UE 102 may include either Y1 MNC digits (Y1 may be less than or equal to Y) or X1 MCC digits (X1 may be less than or equal to X) as its truncated PLMN ID in the RRC message (e.g., RRCSystemInfoRequest message). The UE may include combination of Y1 MNC digits and X1 MCC digits as its truncated PLMN ID in the RRC message (e.g., RRCSystemInfoRequest message). The values of X1 and Y1 may be preconfigured. It should be noted that X1 and Y1 may be zero or positive integer(s).

Figure 6:
FIG. 6 illustrates an example of a truncated PLMN identity, according to an example implementation of the present disclosure.

FIG. 6 illustrates an example of a truncated PLMN identity, according to an example implementation of the present disclosure. A data structure 600 of a truncated PLMN ID may include optional X1 truncated MCC digits and Y truncated MNC digits.

Case#1-3: The UE may include an indicator of its PLMN ID in the RRC message (e.g., RRCSystemInfoRequest message).

Case#1-3-1: The indicator may be a Z1-bit index to represent the number of PLMNs shared by the NR gNB 104, where Z1 may be a positive integer. For example, if the NR gNB 104 supports maximum eight PLMNs, a three-bit index may he used to represent the PLMN information. In one implementation, '000' may represent the first entry of a PLMN list broadcast by the NR gNB 104. The increasing index may correspond to the ascending order of PLMNs in the PLMN list. '000' may represent the last entry of the PLMN list broadcast by the NR gNB 104.

Case#1-3-2: The indicator may be a Z2-bit bitmap, where Z2 may be a positive integer. Each bit in the bitmap may correspond to one PLMN provided by the NR gNB 104. For example, if the NR gNB 104 supports maximum twelve PLMNs sharing the network, Z2 may be twelve, The most significant bit of the bitmap may represent the first entry of a PLMN list broadcast by the NR gNB 104. The bit after the most significant bit of the bitmap may represent the second entry of the PLMN list broadcast by the NR gNB 104, and so on. The least significant bit of the bitmap may represent the last entry of the PLMN list broadcast by the NR gNB 104. The least significant bit of the bitmap may represent the first entry of the PLMN list broadcast by the NR gNB 104. The bit before the least significant bit of the bitmap may represent the second entry of the PLMN list broadcast by the NR gNB 104, and so on. The most significant bit of the bitmap may represent the last entry of a PLMN list broadcast by the NR gNB 104.

Case#1-3-3: The indicator may be an integer that uniquely indicates a selected PLMN sharing the NR gNB 104. The integer set as 1 may indicate that the first PLMN is selected from the PLMN list information in the minimum SI (e.g., SIB1), and the integer set as 2 may indicate that the second PLMN is selected from the PLMN list information in the minimum SI (e.g., SIB1). The maximum value of the integer may be the maximum number of the PLMNs sharing the NR gNB 104. The integer set as 0 may indicate that the first PLMN is selected from the PLMN list information in the minimum SI (e.g., SIB1), and the integer set as 1 may indicate that the second PLMN is selected from the PLMN list information in the minimum SI (e.g., SIB1). The maximum value of the integer may be the maximum number of the PLMNs sharing the NR gNB 104 minus 1.

If the UE 102 does not include any indicator of PLMN information (e.g., any indicator disclosed in Case#1-3, the complete PLMN ID in Case#1-1, or the truncated PLMN ID in Case#1-2) in the RRC message (e.g., RRCSystemInfoRequest message), the NR gNB 104 may determine that every PLMN-specific system information has been requested. The NR gNB 104 may determine that no PLMN-specific system information is requested if the UE 102 does not include any indicator of PLMN information.

Case#1-4: The system information messages may be implicitly mapped to the corresponding PLMNs. In this case, the UE 102 requesting the system information messages may implicitly represent that the UE 102 provides its PLMN information to the NR gNB 104. Table 1 illustrates an example relationship between a system information message and PLMN-specific system information it carries. The system information message #4 may provide at least the system information for PLMN#A. The UE 102 may implicitly or indirectly provide its PLMN information (e.g., PLMN#A) by requesting the system information (SI) message #1, based on the relationship illustrated in Table 1. The order of the SI messages may be implicitly mapped to the PLMN entry order of the PLMN ID list, which may be broadcast by the NR gNB 104.

TABLE 1

SI messages and corresponding PLMN information

| System Information Message | System Information |
|---|---|
| SI message #1 | System information for PLMN#A |
| SI message #2 | System information for PLMN#A |
| SI message #3 | System information for PLMN#B |

Once the NR gNB 104 receives the RRCSystemInfoRequest message, the NR gNB 104 may reply to the UE 102 with system information (e.g., system information message, system information blocks). If the UE 102 provides its PLMN information in the RRC message (e.g., RRCSystemInfoRequest message), the NR gNB 104 may reply to the UE 102 with the system information corresponding to the provided PLMN information.

Case#2-1: If the requested SI message includes system information corresponding to several different PLMNs, the NR gNB 104 may unicast or broadcast the system information related to the PLMN information in the RRC message (e.g., RRCSystemInfoRequest message) provided by the UE 102.

One SI message may include at least one system information block with the same periodicity, and each system information block may carry system information. Within a system information block, sonic system information may be PLMN-specific and some may not be.

Figure 7:
FIG. 7 illustrates one format of an SIB, according to an example implementation of the present disclosure.

FIG. 7 illustrates one format of an SIB, according to an example implementation of the present disclosure. A data structure 700 of the system information block may contain cell-specific information (e.g., Cell-specific-IE) and PLMN-specific information (e.g., PLMN#1-specific-IE for PLMN#1 system information). PLMN#1-specific-IE and PLMN#2-specific-IE may have different system information for PLMN1 and PLMN#2, respectively, such as different values for the same system information category, or different system information categories. PLMN#1-Specific-Info and PLMN#2-Specific-Info may further include the PLMN identities of PLMN#1 and PLMN#2, respectively. The format of the PLMN identity may be a complete PLMN ID, a truncated PLMN ID, a bitmap, an index, an integer, etc. The cell-specific information (e.g., Cell-specific-IE) may be optionally present in the data structure 700 of the system information block. The PLMN-specific information may be present in the data structure 700 of the system information block if the NR gNB receives the PLMN information in the RRC message (e.g., RRCSystemInfoRequest message).

FIG. 8 illustrates another format of an SIB, according to an example implementation of the present disclosure. A data structure 800 of the system information block may include cell-specific information (e.g., Cell-specific-IE) and PLMN-specific information (e.g., PLMN-specific-IE). The PLMN-specific-IE may be a data structure, such as a list. Each entry in the list may include a PLMN identity and its corresponding PLMN-specific information. The format of the PLMN identity may be a complete PLMN ID, a truncated PLMN ID, a bitmap, an index, an integer, etc. The PLMN/-specific information may be access control information of a PLMN corresponding to the PLMN identity. In FIG. 8, it is possible that all PLMNs use the same system information category (e.g., PLMN-INFO) having different values. The access control information may be one type of system information category. PLMN-INFO may represent different system information categories for different PLMNs.

The NR gNB 104 may transmit at least the PLMN-specific system information of a PLMN that is provided by the UE 102 in the RRC message (e.g., RRCSystemInfoRequest message). The PLMN-specific system information may be included in some system information blocks which are indicated by the SI request message (e.g., RRCSystemInfoRequest message). For example, if the RRC message (e.g., RRCSystemInfoRequest message) does not include the PLMN information, the NR gNB 104 may transmit only the cell-specific information (e.g., the Cell-specific-IE in FIG. 7 and FIG. 8) and/or all of the PLMN-specific information. For example, if the RRC message (e.g., RRCSystemInfoRequest message) includes the PLMN information of the UE 102, the NR gNB 104 may transmit at least the system information specific to the PLMN information of the UE 102. Therefore, the cell-specific system information may be optionally transmitted depending on the information in the RRC message (e.g., RRCSystemInfoRequest message). The PLMN-specific information (e.g., the PLMN#1-specific-IE and the PLMN#2-specific-IE in FIG. 7, the PLMN-specific-IF in FIG. 8) may be transmitted when the PLMN information is included in the RRC message (e.g., RRCSystemInfoRequest message).

Case#2-2: If the requested SI message includes several system information blocks and each system information block contains system information for a specific PLMN, the NR gNB 104 may transmit only the system information blocks for the corresponding PLMN provided by the UE 102 in the RRC message (e.g., RRCSystemInfoRequest message) to the UE 102.

One SI message may include at least one system information block with the same periodicity, and each system information block may carry the system information. The system information block may have several versions and each version may include system information for a specific PLMN. FIG. 9 illustrates an example of different versions of the same SIB, according to an example implementation of the present disclosure. An SI message may include an SIB#A, and the SIB#A may have twelve versions. A data structure 900 may include different versions of the SIB#A. The SIB#A-version#1 may include the PLMN#1-specific SIB#A, and the SIB#A-version#2 may include the PLMN2-specific SIB#A, etc., as illustrated in FIG. 9. If the UE 102 that selects PLMN#1 requests the SI message for SIB#A, the NR gNB 104 may transmit the SIB#A-version#1 rather than other versions of the SIB#A. Therefore, the SIB#A with different versions may be transmitted by different SI delivery approaches. If the UE 102 includes its PLMN information in the RRCSystemInfoRequest message and requests SIB#A, the NR gNB 104 may transmit a version of the SIB#A that corresponds to the PLMN information of the UE 102. Therefore, other versions of the SIB#A may not be transmitted. The same SIB number with different versions may also be indicated by different SIB numberings. For example, SIB#A-version#1 may be SIB#A1, SIB#A-version#2 may be SIB#A2, and so on. SIB#A1 and SIB#A2 may include system information of different PLMNs.

Case#2-3: If the requested SI message has different types and each type corresponds to specific PLMNs, the NR gNB 104 may transmit the system information blocks in the requested SI message with the type corresponding to the PLMN information provided by the UE 102 in the RRC message (e.g., RRCSystemInfoRequest message).

One SI message may include at least one system information block with the same periodicity, and each system information block may carry the system information. In one implementation, one SI message may have several types and each type of the SI message may carry system information blocks for a specific PLMN. Therefore, when the UE 102 indicates an SI message(s) and its PLMN information in the RRC message (e.g., RRCSystemInfoRequest message), the NR gNB 104 may transmit the requested SI message(s) with the type for the specific PLMN.

FIG. 10 illustrates another format of an SIB, according to an example implementation of the present disclosure. A data structure 1000 of the SIB1 130 may include scheduling information of system information (e.g., SI-SchedulingInfo in FIG. 10). The SIB1 130 may include the scheduling information of the system information under certain conditions, while under other circumstances, the SIB1 130 may not include the scheduling information of the system information. The scheduling information of the system information may be optionally present in the SIB1 130. The SI-SchedulingInfo may include a list of scheduling information of each SI message (e.g., SchedulingInfo in FIG. 10). The size of the list of scheduling information may range from 1 to the maximum number of the SI messages. The SchedulingInfo may include a broadcast status (e.g., si-BroadcastStatus in FIG. 10). The si-BroadcastStatus may indicate whether the SI message and the corresponding SIBs are currently broadcast. If the SI message and the corresponding SIBs are broadcast, they may be broadcast periodically or broadcast on demand. If the PLMN identity information is included in the scheduling information of the SI message, the UE may further infer that the SI message is on an on-demand basis. The si-BroadcastStatus may be ENUMERATED {broadcast, onDemand}, to let the UE know whether the SI message is currently (periodically) broadcast or if it should be requested on-demand.

The scheduling information (e.g., SchedulingInfo in FIG. 10) in the data structure 1000 may further include PLMN information (e.g., si-plmn) for an SI message to inform the UE 102 of the type of SI message currently broadcast/unicast. The PLMN information (e.g., si-plmn) may be (but not limited to) a PLMN identity or any representatives/short codes/index/integer of the PLMN identity.

FIG. 11 illustrates another format of an SIB, according to an example implementation of the present disclosure. The scheduling information of the SI message(s) may be grouped into two categories: PLMN-specific and cell-specific, as illustrated in FIG. 11. A data structure 1100 of the SIS1 130 may include PLMN-specific scheduling information and cell-specific scheduling information. Each PLMN may have its own scheduling information of the SI message(s) (e.g., SI-SchedulingInfo). A PLMN-specific list of SI-SchedulingInfo (e.g., PLMN-SI-SchedulingInfoList in FIG. 11) may be included in the SIB1 130. The size of the PLMN-specific list may range from 1 to the maximum number of PLMNs operating the cell. The PLMN-specific scheduling information may be optionally present in the SIB 1 130. The NR gNB 104 may not broadcast the PLMN-specific scheduling information in the SIB1 130 in some circumstances (e.g., the NR gNB 104 does not receive any RRC message (e.g., SI request message) including PLMN information), while the NR gNB 104 may broadcast the PLMN-specific scheduling information in the SM1 130 in other circumstances. If the scheduling information of the system information (e.g., SI-SchedulingInfo) is not included in the PLMN-specific scheduling information, the UE 102 may follow the stored, preconfigured or default scheduling information of the system information for the corresponding PLMN. The UE 102 may read only the SI-SchedulingInfo indicated with the same PLMN selected by the UE. Therefore, all of the following information in the SI-SchedulingInfo may be PLMN-specific to the UE 102 and the UE 102 may not need to check the PLMN information for the subsequent system information. Each PLMN may implement its own system information. After reading the PLMN-specific scheduling information of the SI message(s), the UE 102 may find the system information that is specific to the PLMN selected by the UE. The cell-specific scheduling information of the SI message(s) may be generally applied to all UEs camped on the cell. The cell-specific scheduling information of the SI message(s) may not be included in the SIB1 130 under some conditions. If the UE 102 does not receive the cell-specific scheduling information of the SI message(s), the UE 102 may apply the stored, preconfigured or default cell-specific scheduling information of the SI message(s).

The PLMN-specific scheduling information of the SI message(s) may schedule PLMN-specific system information (e.g., access control parameters). The cell-specific scheduling information of the SI message(s) may schedule the system information carrying the cell-specific configuration for the serving cell. The data structure 1100 may include PLMN-specific access control information in addition to (or instead of) the PLMN-specific scheduling information. The list of PLMN-specific scheduling information illustrated in FIG. 11 may be a list of PLMN-specific access control information or access control parameters. Each entry in the list of PLMN-specific access control information may include a PLMN identity (the format of the PLMN identity may be an indicator, an index, an integer, a bitmap, etc.) and its corresponding access control information.

Figure 12:
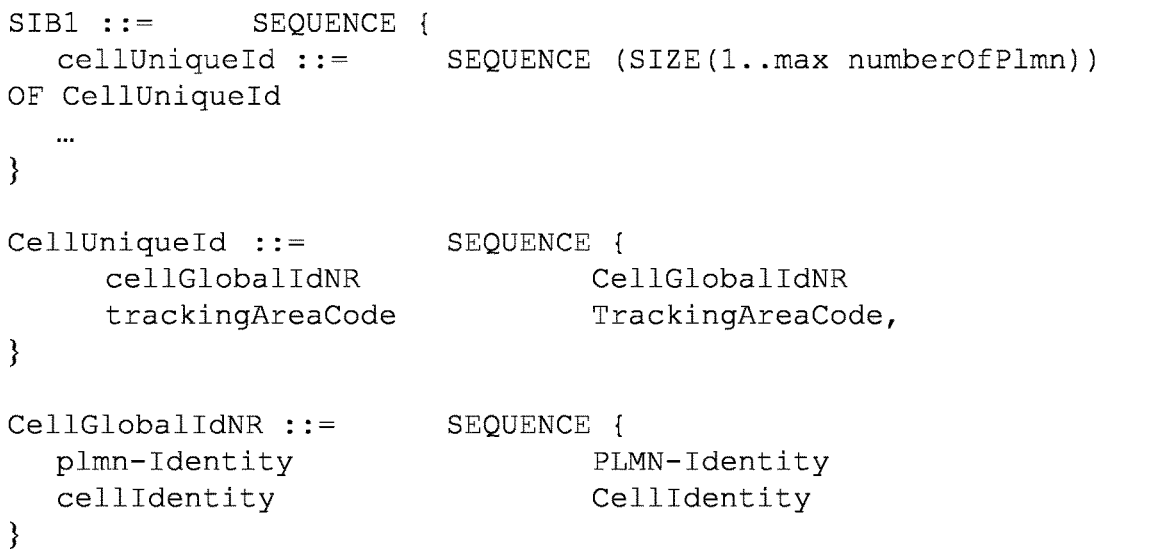
FIG. 12 illustrates another format of an SIB, according to an example implementation of the present disclosure.

Case#3-1: Each PLMN may define its cell identity and tracking area code for the cell. Therefore, the cell may be tagged by a unique combination of the PLMN identity, the cell identity and the tracking area code. FIG. 12 illustrates another format of an SIB, according to an example implementation of the present disclosure. The system information (e.g., the SIB1) may broadcast a list of cell unique identities (e.g., cellUniqueId), as illustrated in FIG. 12. The maximum number of entries in the list may be the maximum number of PLMNs sharing the cell (e.g., 12 in NR). The number of entries in the list may range from one to the number of PLMNs operating the cell. A data structure 1200 of the SIB1 may include a CellUniqueId IE, which may include a cell global identity (e.g., CellGlobalIdNR) and a tracking area code. The cell global identity may include a PLMN identity and a cell identity. Upon reading the cell unique identity information in the system information, the UE 102 may know the PLMNs sharing the cell and the cell identity and/or tracking area code assigned by the PLMN to the cell.

Figure 13:
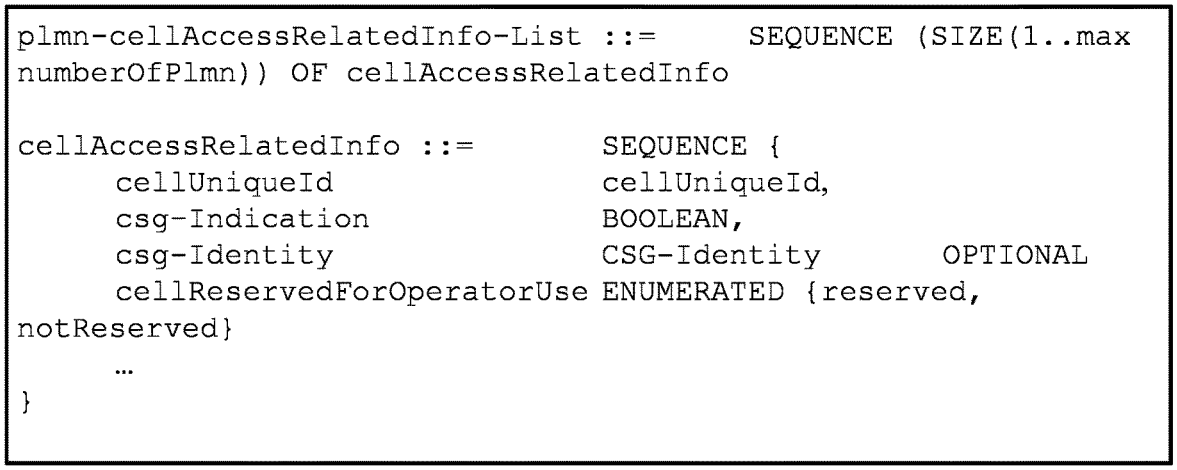
FIG. 13 illustrates one format of PLMN-specific cell access related information, according to an example implementation of the present disclosure.

Case#3-2: Each PLMN may have its own cell access related information for a cell. FIG. 13 illustrates one format of PLMN-specific cell access related information, according to an example implementation of the present disclosure. The cellUniqueId may be included in the cell access related information (e.g., cellAccessRelatedInfo IE in FIG. 13). The list of PLMN-specific cell access related information may be required in the system information. The NR gNB 104 may broadcast or unicast the list of PLMN-specific cell access related information in the system information SIB1). For each cell unique identity, there may be corresponding cell access related information. The cell access related information may be (but not limited to) closed subscriber group (CSG) information, cell reservation information for operator usage, access control information, etc.

Case#3-3: Each PLMN may have its own NR inter-frequency cell re-selection information. Such information (e.g., PLMN-specific NR inter-frequency cell re-selection information) may be included in the system information (e.g., the SIB2, the SIB4). The system information block may include cell-specific and PLMN-specific information (in which case, the Case#2-1 may be applied). Each SIB may have different versions corresponding to different PLMNs, as illustrated in the Case#2-2. The PLMN-specific NR inter-frequency cell re-selection information may be a per-PLMN list structure of information elements (e.g., common cell reselection information, inter-frequency black cell list, inter-frequency carrier frequency list, inter-frequency neighboring cell list) similar to a data structure 1300 illustrated in FIG. 13.

Case#3-4: Each PLMN may have its own inter-RAT cell re-selection information (e.g., PLMN-specific inter-RAT cell re-selection information), which may be included in the system information (e.g., the SIB2, the SIB5). The system information block may include cell-specific and PLMN-specific information (in which case, the Case#2-1 may be applied). Each SIB may have different versions corresponding to different PLMNs, as illustrated in the Case#2-2. The PLMN-specific inter-RAT cell re-selection information may be a per-PLMN list structure of information elements (e.g., cell reselection information common, cell reselection serving frequency information, information about E-UTRA frequencies and E-UTRAs neighbouring cells), similar to the data structure 1300 illustrated in FIG. 13.

Case#3-5: The access control parameters broadcast/unicast by the MR gNB 104 may be cell-specific and/or PLMN-specific. If the access control parameters are cell-specific, they may be referred as a common portion of the access control information to access the NR gNB 104. If the access control parameters are PLMN-specific, they may be regarded as a different portion of the access control information which may be configured and customized by the PLMN. The cell-specific and PLMN-specific access control parameters may be carried in the SIB1, the SIB2, or other system information blocks. The signaling structure in each system information block may utilize the disclosed implementations to differentiate between the common portion (e.g., cell-specific) and the different portion (e.g., PLM-specific) of the access control information. The UE 102 may apply the cell-specific access control parameters upon receiving the cell-specific access control parameters in the system information (e.g., SIB1). The UE 102 may apply the PLMN-specific access control parameters upon receiving the PLMN-specific access control parameters in the system information (e.g., SIB1) or in the dedicated signaling (e.g., an RRC message). The UE 102 may apply both the cell-specific access control parameters and the PLMN-specific access control parameters upon receiving them in the system information. In some implementations, the UE may apply the PLMN-specific access control parameters if the parameters in the cell-specific access control parameters and PLMN-specific access control parameters have a conflict.

Case#3-5-1: The NR gNB 104 may broadcast the cell-specific access control parameters, which may be applied across multiple PLMNs. The cell-specific access control parameters may be carried in the minimum SI (e.g., the MIB and the SIB1). The PLMN-specific access control parameters may be broadcast/unicast by the NR gNB 104 on demand. Both the cell-specific and the PLMN-specific access control parameters may be in the SIB1. Both the cell-specific and the PLMN-specific access control parameters may be in other SI. If the cell-specific system information and the PLMN-specific system information are mapped to different SI messages, they may be transmitted with different periodicities by the NR gNB 104. If the UE 102 does not provide the PLMN information during the system information request, the NR gNB 104 may, by default, treat the request as subject to the cell-specific SI.

Case#3-5-2: If the UE 102 passes the access control check following the cell-specific access control parameters, the UE 102 may further transmit, to the NR gNB 104, the RRC message (e.g., RRCSystemInfoRequest message), which may include the PLMN information of the UE 102, to request PLMN-specific access control parameters.

Case#3-5-3: If the UE 102 is barred due to the access control check following the cell-specific access control parameters, the UE 102 may not request PLMN-specific access control parameters.

Case#3-5-4: if the UE 102 is barred due to the access control check following the PLMN-specific access control parameters, the UE 102 may not request any other PLMN-specific access control parameters.

There may be various processes by which the NR gNB 104 transmits the system information based on the RRC message (e.g., RRCSystemInfoRequest message). The RRC message (e.g., RRCSystemInfoRequest message) generated in the RRC layer of the UE 102 may be transmitted to the NR gNB 104 via an MSG3 (in an RA procedure) in the MAC layer of the UE 102. The RRC layer of the UE 102 may include the RRCSystemInfoRequest message in the RRC PDU and transmit the RRC PDU via SRB0 carried by CCCH to the MAC entity of the UE 102. The MAC entity of the UE 102 may receive the CCCH SDU including the RRC PDU that includes the RRCSystemInfoRequest message. The MAC entity of the UE 102 may transmit the MSG3 including the CCCH SDU. For the MAC layer activity, action 210 illustrated in FIG. 2 may be referred to as transmission of the MSG3 by the UE 102, where the MSG3 may include the RRCSystemInfoRequest message as a CCCH SDU.

Case#4-1: If the MSG3 does not include any UE-specific information (e.g., UE ID) or the RNTI (e.g., (temporary) C-RNTI, Inactive-Radio Network Temporary Identifier (I-RNTI), System Information-Radio Network Temporary Identifier (SI-RNTI)) addressed to the MAC entity of the UE 102, the NR gNB 104 may transmit the system information via broadcast. If the NR gNB 104 successfully receives and decodes the MSG3, the NR gNB 104 may reply with a MAC CE including acknowledgement and broadcast the requested system information. If the NR gNB 104 fails to receive and decode the MSG3, the NR gNB 104 may reply with a MAC CE including negative acknowledgement (e.g., NACK).

Case#4-2: If the MSG3 includes the UE-specific information (e.g., UE ID) and/or the RNTI (e.g., (temporary) C-RNTI, SI-RNTI) addressed to the UE 102's MAC entity, the NR gNB 104 may transmit the system information either via broadcast or via unicast. The UE 102 may receive the value of the RNTI (e.g., (temporary) C-RNTI, I-RNTI, SI-RNTI) in a random access response message. The UE may receive the PDCCH addressed to the RNTI (e.g., (temporary) C-RNTI, I-RNTI, SI-RNTI).

Case#4-2-1: If the NR gNB 104 successfully receives and decodes the MSG3, the NR gNB 104 may reply with a MAC CE including acknowledgement, and broadcast/unicast the requested system information. The UE 102 may monitor the PDCCH transmission addressed to the RNTI (e.g., (temporary) C-RNTI, I-RNTI, SI-RNTI) that the UE 102. transmits during the MSG3 transmission, or the UE 102 receives in the random access response, to receive the MAC CE including acknowledgement and/or unicast/broadcast system information. The PDCCH resources for the UE to receive the unicast SI may be indicated in the MAC CE that includes the acknowledgement.

Case#4-2-2: If the NR gNB 104 fails to decode the MSG3, the NR gNB 104 may reply with a MAC CE that includes negative acknowledgement (e.g., NACK), and broadcast the requested system information.

The RRC message (e.g., RRCSystemInfoRequest message) transmitted by the UE 102 may include information related to a timer. The timer may be preconfigured to the UE 102, broadcast in the system information by the NR gNB 104, or transmitted in dedicated signaling (e.g., RRC message) by the NR gNB 104 to the UE 102. The UE 102 may start the timer after receiving the MAC CE with positive acknowledgement.

Case#5-1: The UE 102 may expect that the requested system information is transmitted by the NR gNB 104 before the timer expires. Therefore, the UE 102 may not transmit the RRC message (e.g., RRCSystemInfoRequest message) to request the same system information (e.g., SI message, SIB) until the timer expires. In one implementation, no preamble is retransmitted until the timer expires.

The UE 102 may transmit, to the NR gNB 104, the RRC message (e.g., RRCSystemInfoRequest message) or a preamble corresponding to the SI request message after the timer expires. If the UE 102 receives the SI message corresponding to the transmitted preamble or RRC message (e.g., RRCSystemInfoRequest message), the UE 102 may stop the timer. The UE 102 may transmit, to the NR gNB 104, the RRC message (e.g., RRCSystemInfoRequest message) or a preamble corresponding to the SI request message after the timer is stopped.

Case#5-2: If the requested system information (e.g., SI message, SIB) includes a cell-specific portion and a PLMN-specific portion, at least the system information the UE 102 requests may be broadcast by the NR gNB 104 until the timer expires.

The timer may be preconfigured by the network (e.g., broadcast in SI or via dedicated signaling). The UE 102 may start the timer after receiving the MAC CE and/or Downlink Control Information (DCI) with positive acknowledgement. The UE 102 may not be allowed to perform a new SI request procedure (e.g., transmit another RRCSystemInfoRequest message) again before the timer expires.

In one implementation, when the requested SI message(s) or SIB(s) includes PLMN-specific information (e.g., the SI for PLMN#1 and the SI for PLMN#2), the NR gNB 104 may take turns to broadcast the requested SI message(s) or SIB(s) in different system information periodicities or in the same system information periodicity. For example, in the first SI period (or modification period or SI window), the NR gNB 104 may broadcast the PLMN#1-specific system information in a requested SI message or SIB. In the second SI period (or modification period or SI window), the NR gNB 104 may broadcast the PLMN#2-specific system information in a requested SI message or SIB, and so on.

Figure 14:
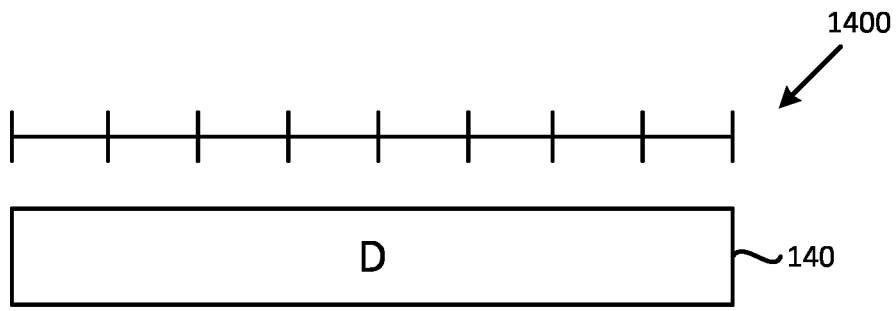
FIG. 14 illustrates a MAC CE including a field "D" for indicating the broadcast delay time, according to an example implementation of the present disclosure.

The MR gNB 104 may transmit a MAC CE including a field "D" to indicate a broadcast delay time within MSG4 to the UE 102. FIG. 14 illustrates a MAC CE 1400 including a field "D" 140 for indicating the broadcast delay time, according to an example implementation of the present disclosure. The broadcast delay time may be indicated by DCI. The broadcast delay time may indicate to the UE 102 when broadcast of the requested SI (e.g., SIB(s) and SI message(s)) begins. Upon receiving the broadcast delay time, the UE 102 may wait for (at least) the broadcast delay time and start the system information acquisition at the start of the next modification period. The UE 102 may monitor the start of the modification period within the broadcast delay time to start the system information acquisition. The UE 102 may assume that broadcast of the required SIB(s) or SI message(s) begins after a broadcast delay time starting from receipt of an MSG4 regardless of the modification period. For example, if the broadcast delay time is X and the UE 102 receives the MSG4 at time point Y, and if the contention resolution of the UE 102 is successful, then the UE 102 may start to read the requested SIB(s) or SI message(s) at time point Y+X. A new value of a logical channel ID (LCID) may be needed to represent the MAC CE 1400 including the field "D"140. The LCID may be included in the MAC subheader associated with the MAC CE 1400. As illustrated in FIG. 14, the field "D" 140 may be an octet having a bit width of 8. The broadcast delay time may not be limited to a fixed bit width (e.g., the bit width may be extended or shortened). If the UE 102 receives a MAC CE with the broadcast delay time, the UE 102 may regard it as a positive acknowledgement. If the UE 102 does not receive a MAC CE with the broadcast delay time, the UE 102 may regard it as a negative acknowledgement.

Figure 15:
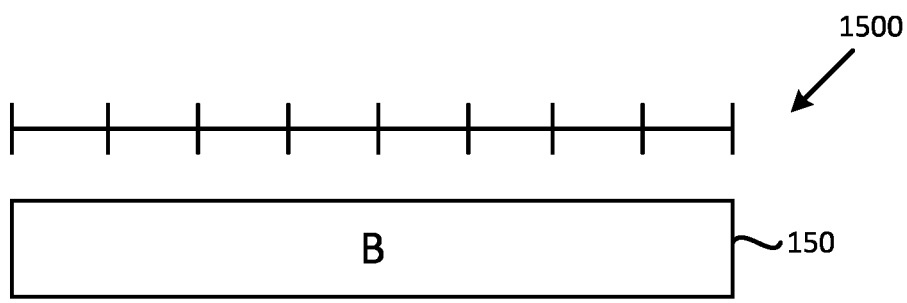
FIG. 15 illustrates a MAC CE including a field "B" for indicating the broadcast monitoring duration, according to an example implementation of the present disclosure.

In some implementations, the NR gNB 104 may transmit a MAC CE including a field "B" to indicate a "broadcast monitoring duration" within MSG4. FIG. 15 illustrates a MAC CE 1500 including a field "B" 150 for indicating the broadcast monitoring duration, according to an example implementation of the present disclosure. The broadcast monitoring duration may be indicated by DCI. The broadcast monitoring duration may represent the number of SI-windows and/or the number of modification periods the UE 102 needs to monitor for the SI acquisition. Once the UE 102 receives the broadcasting monitoring duration, the UE 102 may monitor a duration, e.g., a certain number (whose value is indicated by broadcast monitoring duration) of SI-windows or modification periods, for SI acquisition. A new value of an LCID may be needed to represent the MAC CE 1500 including the field "B" 150. The LCID may be included in the MAC subheader associated with the MAC CE 1500. As illustrated in FIG. 15, the field "B" 150 may be an octet having a bit width of 8. The broadcast monitoring duration may not be limited to a fixed bit width, e.g., the bit width may be extended or shortened. If the UE 102 receives a MAC CE with the broadcast monitoring duration, the UE 102 may regard it as positive acknowledgement. If the UE 102 does not receive a MAC CE with the broadcast monitoring duration, the UE 102 may regard it as negative acknowledgement.

Figure 16:
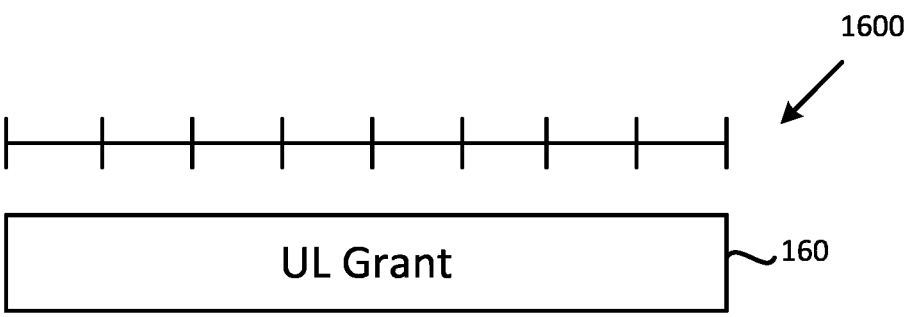
FIG. 16 illustrates a MAC CE including a field "UL Grant" for indicating the uplink (UL) resources for a UE, according to an example implementation of the present disclosure.

The NR gNB 104 may transmit a MAC CE including a field "UL Grant" to indicate the FL resources for the UE 102 within MSG4. FIG. 16 illustrates a MAC CE 1600 including a field "UL Grant" 160 for indicating the UL resources for a UE, according to an example implementation of the present disclosure. The "UL Grant" may be indicated by one of the DCI formats to indicate the UL resources for the UE 102. Once the UE 102 receives the UL grant, the UE 102 may transmit additional information (e.g., PLMN information, UE ID, I-RNTI, UE specific information) to the NR gNB 104 on the UL resources indicated by the UL Grant. A new value of an LCID may be needed to represent the MAC CE 1600 including the field "UL Grant" 160. The LCID may be included in the MAC subheader associated with the MAC CE 1600. As illustrated in FIG. 16, the field "UL Grant" 160 may be an octet having a bit width of 8. The UL Grant may not be limited to a fixed bit width, e.g., the bit width may be extended or shortened. If the UE 102 receives a MAC CE with the UL Grant, the UE may regard it as positive acknowledgement. If the UE 102 does not receive a MAC CE with the UL Grant, the UE 102 may regard it as negative acknowledgement.

Figure 17:
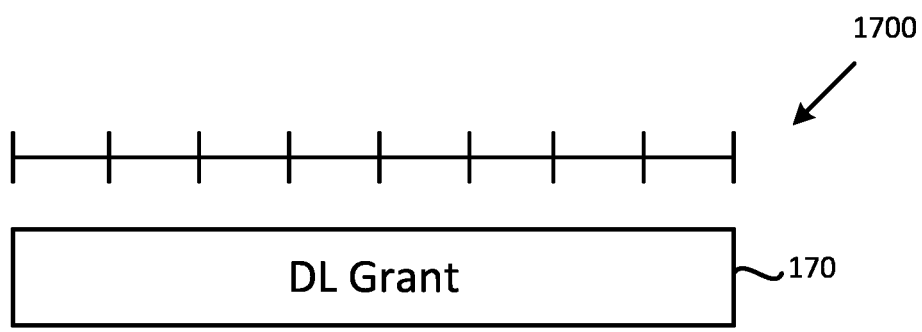
FIG. 17 illustrates a MAC CE including a field "DL Grant" for indicating the downlink (DL) resources for a UE, according to an example implementation of the present disclosure.

The NR gNB 104 may transmit a MAC CE including a field "DL Grant" to indicate the DL resources for the UE 102 within MSG4. FIG. 17 illustrates a MAC CE 1700 including a field "DL Grant" 170 for indicating the DL resources for a UE, according to an example implementation of the present disclosure. The "DL Grant" may be indicated by one of the DCI formats to indicate the DL resources for the UE 102. Once the UE 102 receives the DL grant, the UE 102 may receive system information (either via broadcast or via unicast) from the NR gNB 104 on the DL resources indicated by the DL Grant. The DL Grant may further include the SI-RNTI for the UE 102 to receive the system information. A new value of an LCID may be needed to represent the MAC CE 1700 including the field "DL Grant" 170. The LCID may be included in the MAC subheader associated with the MAC CE 1700. As illustrated in FIG. 17, the field "DL Grant" 170 may be an octet having a bit width of 8. The DL Grant may not be limited to a fixed bit width, e.g., the bit width may be extended or shortened. If the UE 102 receives a MAC CE with the DL Grant, the UE 102 may regard it as positive acknowledgement. If the UE 102 does not receive a MAC CE with the DL Grant, the UE 102 may regard it as negative acknowledgement. The MAC CE with the DL Grant or the DCI format to indicate the DL Grant may not be limited to transmission in MSG4.

Figure 18:
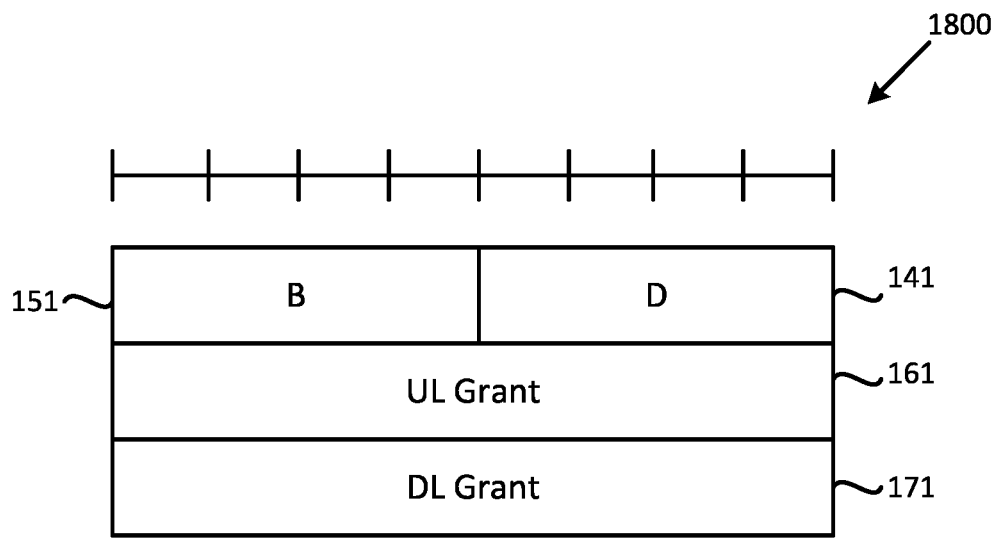
FIG. 18 illustrates a MAC CE including fields "D" "B", "UL Grant", and "DL Grant", according to an example implementation of the present disclosure.

The NR gNB 104 may transmit at least one of a broadcast delay time, a broadcast monitoring duration, a UL Grant, and a DL Grant within MSG4 to the UE 102. FIG. 18 illustrates a MAC CE 1800 including fields "D" 141, "B" 151, "UL Grant" 161, and "DL Grant" 171, according to an example implementation of the present disclosure. The broadcast delay time may indicate the beginning of an SI acquisition procedure to the UE 102. The broadcast monitoring duration may indicate the duration for the SI acquisition to the UE 102. The UL Grant may indicate the UL resources for the UE 102 to transmit more information requested by the NR gNB 104. The UE 102 may transmit the UE-specific information to the NR gNB 104. The DL Grant may indicate the DL resources for the UE 102 to receive the unicast/broadcast system information. A new value of an LCID may be needed to represent the MAC CE 1800 including at least one of the fields "B" 151, "D" 141, "UL Grant" 161, and "DL Grant" 171. The LCID may be included in the MAC subheader associated with the MAC CE 1800. As illustrated in FIG. 18, the field "B" 151 and the field "D" 141 may both have a bit width of 4, and the field "UL Grant" 161 and the field "DL Grant" 171 may both have a bit width of 8. The bit width of each field may be extended or shortened. If the UE 102 receives a MAC CE with at least one of the broadcast delay time, the broadcast monitoring period, the UL Grant, and the DL Grant, the UE 102 may regard it as positive acknowledgement. If the UE 102 does not receive a MAC CE with at least one of the broadcast delay time, the broadcast monitoring period, the UL Grant, and the DL Grant, the UE 102 may regard it as negative acknowledgement.

There may be various processes via which the NR gNB 104 sends a positive/negative acknowledgement in MSG4 in response to reception of MSG3 (which may include the RRC message (e.g., RRCSystemInfoRequest message) as a CCCH SDU).

Figure 19:
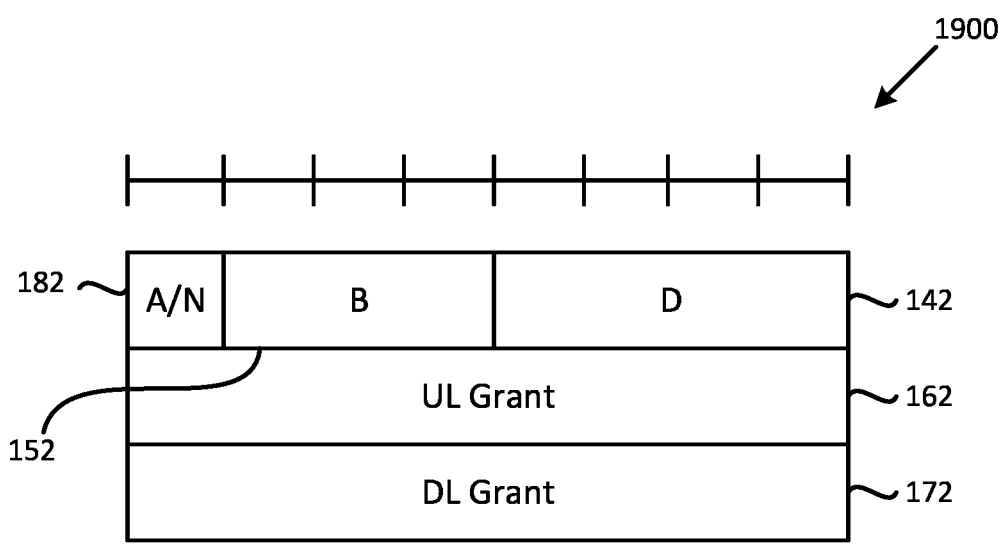
FIG. 19 illustrates a MAC CE including fields "D", "B", "UL Grant", "DL Grant", and "A/N" for indicating acknowledgment, according to an example implementation of the present disclosure.

Case#6-1: The MAC CE may include at least one bit "A/N" to indicate whether the MSG3 is successfully received by the NR gNB 104. The bit value '1' may indicate a positive acknowledgement, and '0' may indicate a negative acknowledgement. FIG. 19 illustrates a MAC CE 1900 including fields "D" 142, "B" 152, "UL Grant" 162, "DL Grant" 172, and "A/N" 182 for indicating acknowledgment, according to an example implementation of the present disclosure.

Case#6-1-1: The rest of the bits in the MAC CE 1900, which includes at least one bit for acknowledgement of MSG3, may be reserved for further/reserved use. These bits may be padding bits. The fields "B" 152, "D" 142. "UL Grant" 162 and "DL Grant" 172 in FIG. 19 may be padding bits or all zeros for further/reserved use. A new value of an LCID may be needed to represent the MAC CE 1900. The LCD may be included in the MAC subheader associated with the MAC CE 1900.

Case#6-1-2: The rest of the bits in the MAC CE 1900, which includes at least one bit for acknowledgement of MSG3, may be used to represent at least one of the broadcast delay time (the "D" field 142), the broadcast monitoring duration (the "B" field 152), the UL Grant field 162, and the DL Grant field 172, as illustrated in FIG. 19. As illustrated in FIG. 19, the field "A/N" 182 may have a bit width of 1, the field "B" 152 may have a bit width of 3, the field "D" 142 may have a bit width of 4, and the field "UL Grant" 162 and the field "DL Grant" 172 may both have a bit width of 8. The bit width of each field may be extended or shortened. A new value of an LCD may be needed to represent the MAC CE 1900. The LCD may be included in the MAC subheader associated with the MAC CE 1900.

A MAC CE including a UE Contention Resolution Identity (also referred to as the UE Contention Resolution Identity MAC CE) may be utilized as the positive/negative acknowledgement for MSG3. The UE Contention Resolution Identity MAC CE may have a fixed W-bit size (e.g., W=48). The field of the UE Contention Resolution Identity may contain a UL CCCH SDU (e.g., including the RRC message (e.g., RRCSystemInfoRequest message)). If the UE 102 receives a MAC CE having the UE Contention Resolution identity that matches a portion of (e.g., the first W bits of) the UL CCCH SDU including the RRC message (e.g., RRCSystemInfoRequest message), the UE 102 may regard it as a positive acknowledgement. In a case of a positive acknowledgment, a MAC entity of the UE 102 may indicate reception of an acknowledgement for the RRC message (e.g., RRCSystemInfoRequest message) to an upper layer entity (e.g., RRC entity) of the UE 102.

Figure 20:
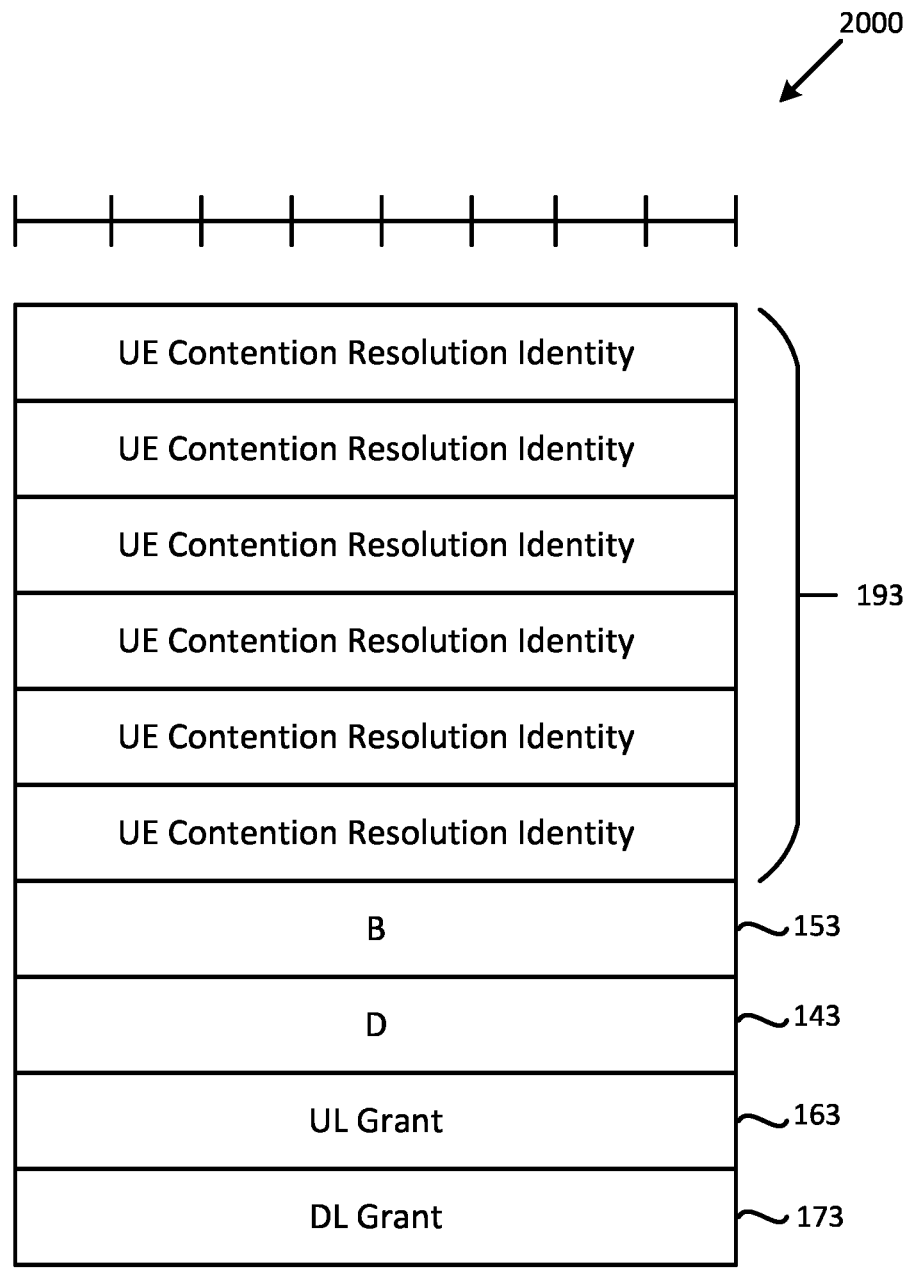
FIG. 20 illustrates a MAC CE including fields "D", "B", "UL Grant", "DL Grant", and the UE contention resolution identity, according to an example implementation of the present disclosure.

At least one of the fields "B", "D", "UL Grant", and "DL Grant" may be included in the MAC CE after the UE Contention Resolution Identity. FIG. 20 illustrates a MAC CE 2000 including fields "D" 143, "B" 153, "UL Grant" 163, "DL Grant" 173, and the UE contention resolution identity 193, according to an example implementation of the present disclosure. As illustrated in FIG. 20, each of the fields "D" 143, "B" 153, "UL Grant" 163, "DL Grant" 173 may have a bit width of 8, and the field UE contention resolution identity 193 may have a bit width of 48. The bit width of each field may be extended or shortened. If the 102 receives the UE Contention Resolution Identity MAC CE with at least one of the fields "B", "D", "UL Grant" and "DL Grant", the UE 102 may be provided at least one of the settings of the broadcast delay time, the broadcast monitoring duration, the UL Grant to transmit additional information, and the DL Grant to receive unicast/broadcast system information.

Case#7-1: A new LCID may be needed for a UE Contention Resolution Identity MAC CE with at least one of the fields "B", "D". "UL Grant" and "DL Grant".

Case#7-2: The LCID of the UE Contention Resolution Identity MAC CE may be reused and one bit (e.g., the reservation bit) in the MAC subheader may be used to indicate/associate for such UE Contention Resolution Identity MAC CE with at least one of the fields "B", "D", "UL Grant" and "DL Grant".

Case#7-3: The LCID and MAC subheader of the UE Contention Resolution Identity MAC CE may be reused for a UE Contention Resolution Identity MAC CE with at least one of the fields "B", "D", "UL Grant" and "DL Grant". For UEs in an RA procedure waiting for MSG4 reception, the UEs may ignore at least one of the fields "B", "D", "UL Grant" and "DL Grant". For UEs in an RA procedure waiting for MSG4 reception, at least one of the fields "B". "D", "UL Grant" and "DL Grant" may be set to a predefined value. For UEs in an RA procedure waiting for MSG4 reception, the NR gNB 104 may not include at least one of the fields "B", "D", "UL Grant" and "DL Grant". UEs sending the RRC message (e.g., RRCSystemInfoRequest message) and waiting for MSG4 reception may follow the indication from at least one of the fields "B", "D", "UL Grant" and "DL Grant" for the SI acquisition procedure.

Figure 21:
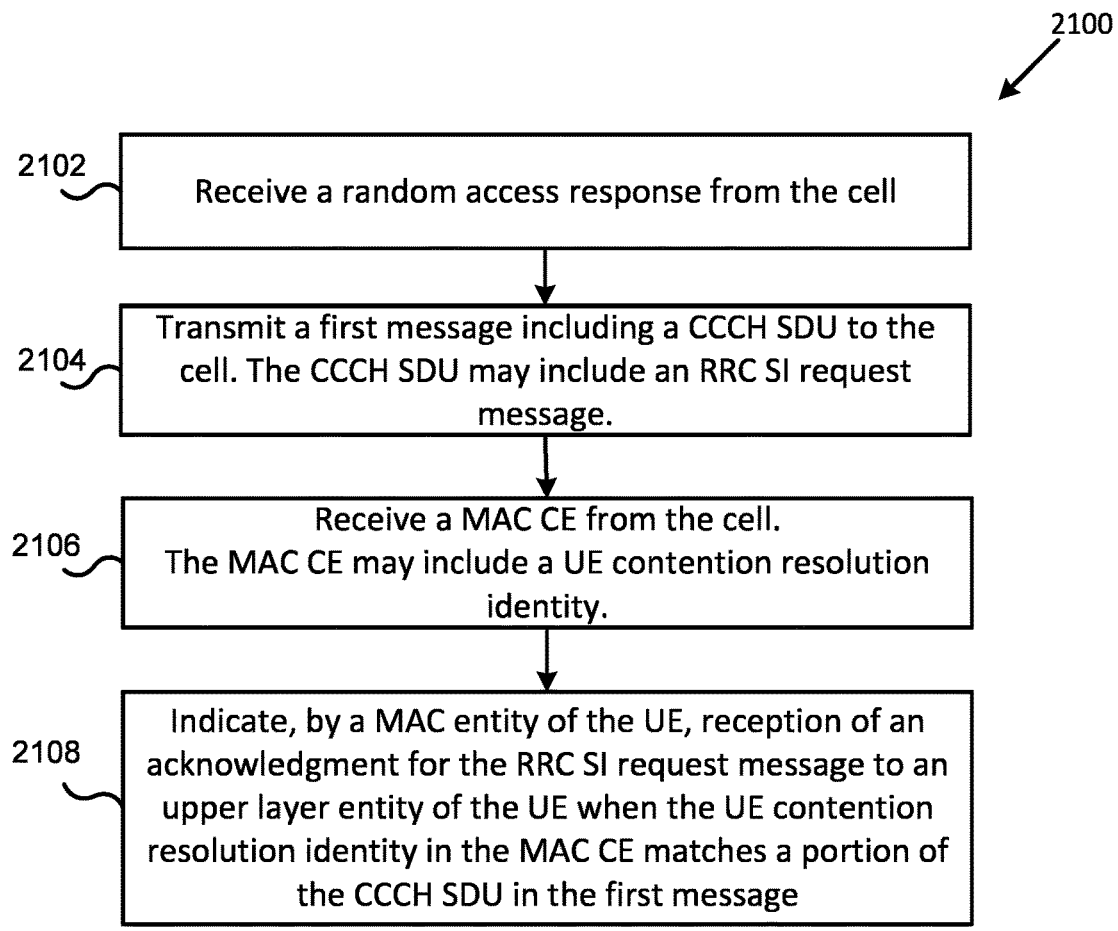
FIG. 21 is a flowchart for a method of wireless communications performed by a UE, according to an example implementation of the present disclosure.

FIG. 21 is a flowchart for a method of wireless communications performed by a UE, according to an example implementation of the present disclosure. The method 2100 may include actions 2102, 2104, 2106 and 2108. In action 2102, the UE may receive a random access response from the cell. The random access response may be an MSG2 in an MSG3-based on-demand system information request procedure. In action 2104, the UE may transmit a first message (e.g., MSG3) including a CCCH SDU to the cell. The CCCH SDU may include an RRC SI request message (e.g., RRC-SystemInfoRequest message). In action 2106, the UE may receive a MAC CE (e.g., MSG4) from the cell. The MAC CE may include a UE contention resolution identity. FIG. 20 illustrates the MAC CE including the UE contention resolution identity. In action 2108, a MAC entity of the UE may indicate reception of an acknowledgment for the RRC SI request message to an upper layer entity of the UE (e.g., the RRC entity of the UE) when the UE contention resolution identity in the MAC CE matches a portion of (e.g., the starting W bits of) the CCCH SDU in the first message. W is equal to 48 as illustrated in FIG. 20, but may also be other positive integers in other implementations.

Once the UE 102 successfully receives MSG4 (e.g., at least the DCI and/or MAC CE) in response to MSG3, the UE 102 may further transmit a message (e.g., MSG5, RRC message, RRC SI request complete message, RRC connection setup complete message) to transmit the required information to complete the RRC connection setup procedure. The required information in the message (e.g., MSG5) may include at least one of the following: a UE ID, an I-RTI, PLMN information/indicator/identity/index/bitmap, a registered Mobility Management Entity (MME)/Access and Mobility Management Function (AMF), dedicated Non-Access Stratum (NAS) information, a System Architecture Evolution (SAE)-Temporary Mobile Subscriber Identity ((5G)-S-TMSI). The UE 102 may transmit the information on the UL resources indicated by the UL Grant in MSG4 (e.g., a MAC CE, a DCI format). The UE 102 may enter an RRC_CONNECTED state after the UE 102 transmits the information and completes the RRC connection setup procedure.

The content of the "MAC CE" may also be applied for the "MAC payload" or the "MAC RAR".

Figure 22:
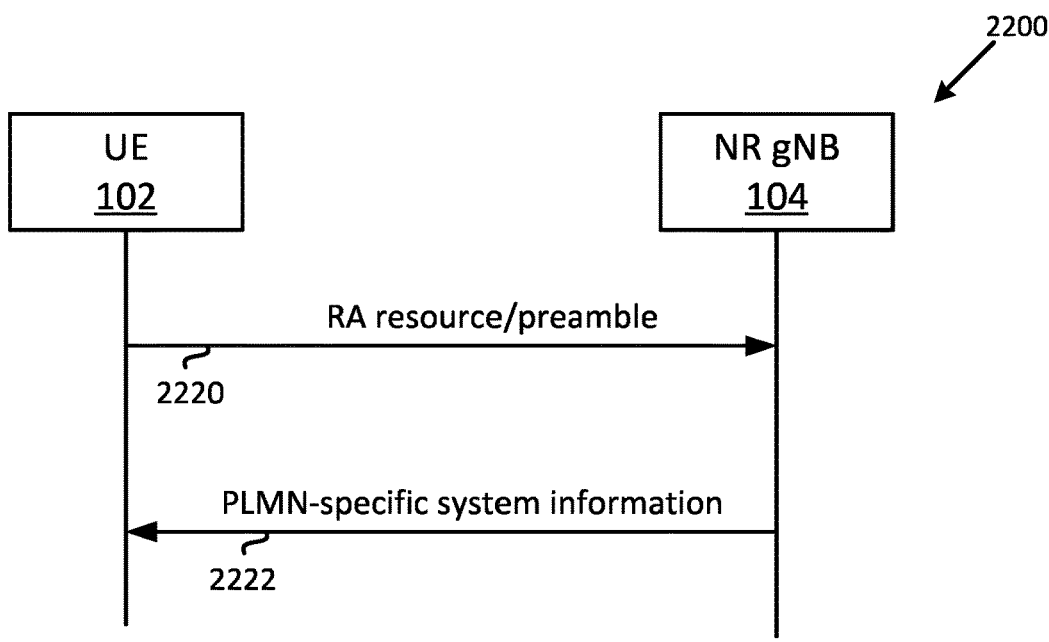
FIG. 22 is a sequence diagram illustrating a process of system information request and response, according to an example implementation of the present disclosure.

The preambles and/or random access resources indicated in the si-Request-Config IE in the SIB1 may be associated with the PLMN-specific information. For example, these resources may be associated with PLMN information, PLMN-specific SI messages, or PLMN-specific SLBs. FIG. 22 is a sequence diagram illustrating a process of system information request and response, according to an example implementation of the present disclosure. The method 2200 may include actions 2220 and 2222. The UTE 102 may request the system information using an MSG1-based approach. For example, as illustrated in FIG. 22, in action 2220, the UE 102 may transmit random access resources to the NR gNB 104. The NR gNB 104 may provide the requested PLMN information, PLMN-specific SI messages, or PLMN-specific SIBs based on the configured (dedicated) RA (random access) resources on which a preamble is received, or the configured (dedicated) preamble received. In action 2222, the NR gNB 104 may transmit PLMN-specific system information to the UE 102. The same preamble may be assigned for one specific SI request, but the NR gNB 104 may further provide different PRACH slots to different PLMN-specific SI requests. By transmitting the preamble in one dedicated PRACH slot, the NR gNB 104 may identify the PLMN-specific information related to the SI requested by the UE 102. Alternatively, an implicit PRACH resources assignment may be used. The fact that the UE 102 transmits the dedicated preamble at the first ordering PRACH resources in the slot may correspond to the situation that the first PLMN info (ordering by supported PLMN information broadcast in the minimum SI) is requested. The UE 102 may receive the PLMN-specific system information after the random access resources and/or preambles transmission.

If the UE 102 receives the negative acknowledgement from the NR gNB 104, the LTE 102 may initiate an SI request (e.g., an RRCSystemInfoRequest message, sending the random access resources e.g., preamble)) again. If the UE 102 cannot receive the system information within the time duration indicated by at least one of the broadcast delay time, the broadcast monitoring duration and the DL Grant, the UE 102 may initiate an SI request (e.g., an RRCSystemInfoRequest message, sending the random access resources (e.g., preamble)) again.

The NR gNB 104 may reply to the requested system information in different ways based on the UE 102's RRC state. If the UE 102 is in an RRC_CONNECTED state, the NR gNB 104 may reply to the system information with dedicated signaling (e.g., via unicast). If the UE 102 is in an RRC_IDLE state or an RRC_INACTIVE state, the NR gNB 104 may reply to the system information via broadcast. The pattern of broadcast may be one shot or periodic within a certain duration.

The disclosed NR gNB or cell may be applied to any base station, regardless of the radio access technologies.

The disclosed PLMN-specific system information signaling structure are not limited to the other SI delivery approach (e.g., on-demand). Some aspects of the present disclosure may also be applied for the system information broadcast periodically.

Figure 23:
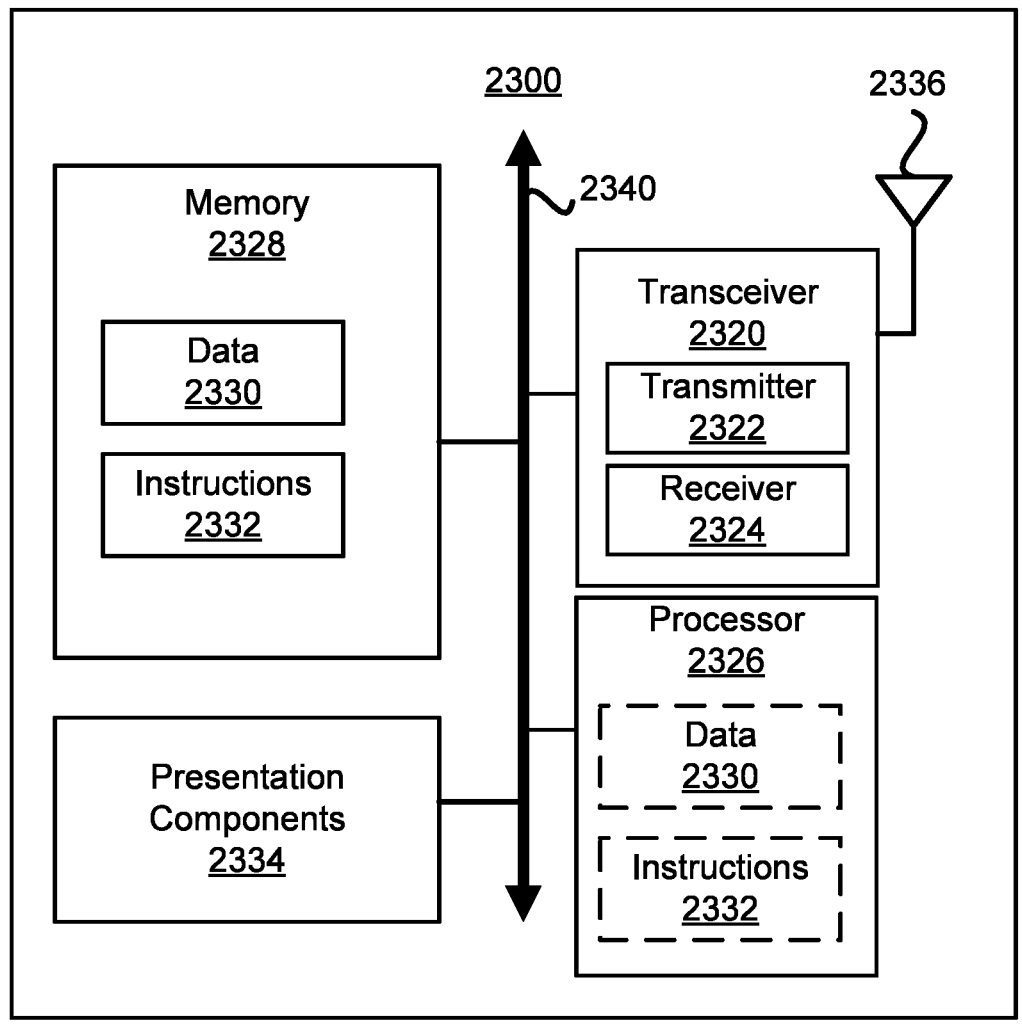
FIG. 23 illustrates a block diagram of a node for wireless communication, in accordance with various aspects of the present disclosure.

FIG. 23 illustrates a block diagram of a node 2300 for wireless communication, in accordance with various aspects of the present disclosure. As illustrated in FIG. 23, a node 2300 may include a transceiver 2320, a processor 2326, a memory 2328, one or more presentation components 2334, and at least one antenna 2336. The node 2300 may also include a radio frequency (RF) spectrum band module, a base station communications module, a network communications module, and a system communications management module, Input/Output (I/O) ports, I/O components, and a power supply (not illustrated in FIG. 23).

Each of the components may directly or indirectly communicate with each other over one or more buses 2340. The node 2300 may be a UE or a BS that performs various functions disclosed with reference to FIGS. 1 through 22.

The transceiver 2320 has a transmitter 2322 (e.g., transmitting/transmission circuitry) and a receiver 2324 (e.g., receiving/reception circuitry) and may be configured to transmit and/or receive time and/or frequency resource partitioning information. The transceiver 2320 may be configured to transmit in different types of subframes and slots including, but not limited to, usable, non-usable and flexibly usable subframes and slot formats. The transceiver 2320 may be configured to receive data and control channels.

The node 2300 may include a variety of computer-readable media. Computer-readable media may be any available media that may be accessed by the node 2300 and include both volatile (and non-volatile) media, and removable (and non-removable) media.

The computer-readable media may include computer-storage media and communication media. Computer-storage media may include both volatile (and/or non-volatile) media, and removable (and/or non-removable) media implemented in any method or technology for storage of information such as computer-readable instructions, data structures, program modules or data.

Computer-storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media may not include a propagated data signal. Communication media may typically embody computer-readable instructions, data structures, program modules or other data in a modulated data signal such as a carrier wave or other transport mechanisms and include any information delivery media.

The term "modulated data signal" may refer a signal that has one or more of its characteristics set or changed in such a manner as to encode information in the signal. Communication media may include wired media such as a wired network or direct-wired connection, and wireless media such as acoustic, RF, infrared and other wireless media. Combinations of any of the previously disclosed components should also be included within the scope of computer-readable media.

The memory 2328 may include computer-storage media in the form of volatile and/or non-volatile memory. The memory 2328 may be removable, non-removable, or a combination thereof. Example memory may include solid-state memory, hard drives, optical-disc drives, etc. As illustrated in FIG. 23, the memory 2328 may store computer-readable and/or computer-executable instructions 2332 (e.g., software codes) that are configured to, when executed, cause the processor 2326 to perform various functions disclosed herein, for example, with reference to FIGS. 1 through 22. Alternatively, the instructions 2332 may not be directly executable by the processor 2326 but be configured to cause the node 2300 (e.g., when compiled and executed) to perform various functions disclosed herein.

The processor 2326 (e.g., having processing circuitry) may include an intelligent hardware device, e.g., a Central Processing Unit (CPU), a microcontroller, an ASIC, etc. The processor 2326 may include memory. The processor 2326 may process the data 2330 and the instructions 2332 received from the memory 2328, and information transmitted and received via the transceiver 2320, the base band communications module, and/or the network communications module. The processor 2326 may also process information to provide to the transceiver 2320 for transmission via the antenna 2336 to the network communications module for transmission to a CN.

One or more presentation components 2334 may present data indications to a person or another device. Examples of presentation components 2334 may include a display device, a speaker, a printing component, a vibrating component, etc.

In view of the present disclosure, it is obvious that various techniques may be used for implementing the disclosed concepts without departing from the scope of those concepts. Moreover, while the concepts have been disclosed with reference to specific implementations, a person of ordinary skill in the art may recognize that changes may be made in form and detail without departing from the scope of those concepts. Therefore, the disclosed implementations are considered in all respects as illustrative and not restrictive. It should also be understood that the present disclosure is not limited to the specific disclosed implementations. Still, many rearrangements, modifications, and substitutions are possible without departing from the scope of the present disclosure.

What is claimed is:

1. A method for providing system information (SI) performed by a base station (BS), the method comprising:
   broadcasting a system information block type 1 (SIB1) associated with a cell;
   receiving, from a user equipment (UE), a first message including a common control channel (CCCH) service data unit (SDU), the CCCH SDU including a radio resource control (RRC) SI request message; and
   transmitting, to the UE, a medium access control (MAC) control element (CE) including a UE contention resolution identity that matches a portion of the CCCH SDU, wherein:
      the MAC CE enables a MAC entity of the UE to indicate reception of an acknowledgment for the RRC SI request message to an RRC entity of the UE, and
      the SIB1 does not include information related to a Random Access (RA) resource specific to SI requested by the RRC SI request message.

2. The method of claim 1, wherein the SIB1 includes a first list, a number of entries in the first list ranging from one to a number of public land mobile networks (PLMNs) operating the cell, and each entry in the first list includes:
   an indicator corresponding to a PLMN operating the cell; and
   access control information of the PLMN operating the cell.

3. The method of claim 2, wherein the SIB1 further includes a second list, a number of entries in the second list ranging from one to the number of PLMNs operating the cell, and each entry in the second list includes:
   a PLMN identity;
   a cell identity; and
   a tracking area code.

4. The method of claim 2, wherein the SIB1 further includes cell-specific scheduling information.

5. The method of claim 2, wherein the SIB1 further includes scheduling information indicating whether an SI message is broadcast.

6. The method of claim 5, wherein the scheduling information further indicates PLMN information corresponding to the SI message.

7. The method of claim 1, wherein the RRC SI request message is received by the MAC entity of the UE via a CCCH, which is configured with a transparent mode radio link control (RLC) entity.

8. The method of claim 1, wherein:
   the MAC CE further enables the UE to start a timer after receiving the MAC CE; and
   the RRC SI request message includes information related to the timer.

9. The method of claim 1, wherein the MAC CE further includes at least one of:
   a broadcast delay time;
   a broadcast monitoring duration;
   an uplink (UL) grant; or
   a downlink (DL) grant.

10. The method of claim 1, further comprising receiving, from the UE, a second message to complete an RRC connection setup procedure, wherein the second message includes at least one of:
   a UE identifier (ID);
   an inactive radio network temporary identifier (I-RNTI);
   public land mobile networks (PLMNs) information;
   a registered Mobility Management Entity (MME) or Access and Mobility Management Function (AMF);
   dedicated non-access stratum (NAS) information; or
   a System Architecture Evolution (SAE)-Temporary Mobile Subscriber Identity (S-TMSI).

11. A base station (BS) for providing system information (SI), the BS comprising:
   one or more non-transitory computer-readable media having computer-executable instructions embodied thereon; and
   at least one processor coupled to the one or more non-transitory computer-readable media, and configured to execute the computer-executable instructions to:
   broadcast a system information block type 1 (SIB1) associated with a cell;
   receive, from a user equipment (UE), a first message including a common control channel (CCCH) service data unit (SDU), the CCCH SDU including a radio resource control (RRC) SI request message; and
   transmit, to the UE, a medium access control (MAC) control element (CE) including a UE contention resolution identity that matches a portion of the CCCH SDU, wherein:
      the MAC CE enables a MAC entity of the UE to indicate reception of an acknowledgment for the RRC SI request message to an RRC entity of the UE, and
      the SIB1 does not include information related to a Random Access (RA) resource specific to SI requested by the RRC SI request message.

12. The BS of claim 11, wherein the SIB1 includes a first list, a number of entries in the first list ranging from one to a number of public land mobile networks (PLMNs) operating the cell, and each entry in the first list includes:
   an indicator corresponding to a PLMN operating the cell; and
   access control information of the PLMN operating the cell.

13. The BS of claim 12, wherein the SIB1 further includes a second list, a number of entries in the second list ranging from one to the number of PLMNs operating the cell, and each entry in the second list includes:
   a PLMN identity;
   a cell identity; and
   a tracking area code.

14. The BS of claim 12, wherein the SIB1 further includes cell-specific scheduling information.

15. The BS of claim 12, wherein the SIB1 further includes scheduling information indicating whether an SI message is broadcast.

16. The BS of claim 15, wherein the scheduling information further indicates PLMN information corresponding to the SI message.

17. The BS of claim 11, wherein the RRC SI request message is received by the MAC entity of the UE via a CCCH, which is configured with a transparent mode radio link control (RLC) entity.

18. The BS of claim 11, wherein:
   the MAC CE further enables the UE to start a timer after receiving the MAC CE; and
   the RRC SI request message includes information related to the timer.

19. The BS of claim 11, wherein the MAC CE further includes at least one of:
   a broadcast delay time:
   a broadcast monitoring duration;

an uplink (UL) grant; or a downlink (DL) grant.

20. The BS of claim 11, the at least one processor being further configured to execute the computer-executable instructions to cause the BS to receive, from the UE, a second message to complete an RRC connection setup procedure, wherein the second message comprises at least one of:

a UE identifier (ID);

an inactive radio network temporary identifier (I-RNTI);

public land mobile networks (PLMNs) information;

a registered Mobility Management Entity (MME) or Access and Mobility Management Function (AMF);

dedicated non access stratum (NAS) information; or a System Architecture Evolution (SAE)-Temporary Mobile Subscriber Identity (S-TMSI).

* * * * *